US012567203B2

(12) United States Patent
Shirai

(10) Patent No.: US 12,567,203 B2
(45) Date of Patent: Mar. 3, 2026

(54) INFORMATION PROCESSING SYSTEM, INFORMATION PROCESSING METHOD, AND INFORMATION PROCESSING PROGRAM

(71) Applicant: GREE, Inc., Tokyo (JP)

(72) Inventor: Akihiko Shirai, Kanagawa (JP)

(73) Assignee: GREE HOLDINGS, INC., Tokyo (JP)

( * ) Notice: Subject to any disclaimer, the term of this patent is extended or adjusted under 35 U.S.C. 154(b) by 196 days.

(21) Appl. No.: 18/215,201

(22) Filed: Jun. 28, 2023

(65) Prior Publication Data

US 2023/0368464 A1    Nov. 16, 2023

Related U.S. Application Data

(63) Continuation of application No. PCT/JP2022/009184, filed on Mar. 3, 2022.

(30) Foreign Application Priority Data

Mar. 30, 2021    (JP) ................................. 2021-057215

(51) Int. Cl.
| | |
|---|---|
| *G06T 17/00* | (2006.01) |
| *G06F 3/0346* | (2013.01) |
| *G06T 13/40* | (2011.01) |

(52) U.S. Cl.
CPC ............ *G06T 17/00* (2013.01); *G06F 3/0346* (2013.01); *G06T 13/40* (2013.01)

(58) Field of Classification Search
CPC ............ H04N 21/4781; H04N 21/431; H04N 21/4788; H04N 7/157; H04N 19/176;
(Continued)

(56) References Cited

U.S. PATENT DOCUMENTS

| | | | | |
|---|---|---|---|---|
| 7,958,453 B1* | 6/2011 | Taing | .................. | H04L 12/1827 |
| | | | | 709/204 |
| 2009/0165140 A1 | 6/2009 | Robinson et al. | | |

(Continued)

FOREIGN PATENT DOCUMENTS

| | | |
|---|---|---|
| JP | 2020107264 A | 7/2020 |
| JP | 2021-5237 A | 1/2021 |

(Continued)

OTHER PUBLICATIONS

International Search Report and Written Opinion mailed on May 17, 2022, received for PCT Application PCT/JP2022/009184, filed on Mar. 3, 2022, 11 pages including English Translation.

(Continued)

*Primary Examiner* — Xilin Guo
(74) *Attorney, Agent, or Firm* — XSENSUS LLP

(57) ABSTRACT

An information processing system includes processing circuitry configured to detect a state of a first user distributing content including an image of a first virtual space, the image including a plurality of layers; display the image, which is viewable by the first user watching the content via a first terminal or viewable by a second user watching the content via a second terminal; and store a first display medium associated with the first user. To display the image, the processing circuitry generates a first image region of a layer, of the plurality of layers, relating to the first display medium, and generates a second image region of a layer, of the plurality of layers, relating to a first user interface, and the processing circuitry changes a state of the first display medium in the first image region based on the detected state of the first user.

20 Claims, 21 Drawing Sheets

(58) Field of Classification Search
CPC ........ G06F 3/017; G06F 3/0346; G06F 3/011;
G06F 3/04815; G06F 16/954; A63F
13/53; G06T 17/00; G06T 13/40; G06T
19/006; G06T 19/20; G06T 19/00; G06T
15/205; G06T 2200/24; G06Q 10/10;
G06V 40/20; G06V 10/25; G06V 40/28
See application file for complete search history.

(56) References Cited

U.S. PATENT DOCUMENTS

| | | | | |
|---|---|---|---|---|
| 2012/0206577 A1* | 8/2012 | Guckenberger | ..... | G09B 19/003 |
| | | | | 348/47 |
| 2016/0349958 A1 | 12/2016 | Hyun | | |
| 2017/0124755 A1 | 5/2017 | Walters et al. | | |
| 2018/0173323 A1* | 6/2018 | Harvey | .................. | G06F 3/011 |

| | | | | |
|---|---|---|---|---|
| 2020/0402304 A1* | 12/2020 | Hwang | .................. | G06T 7/168 |
| 2022/0360619 A1 | 11/2022 | Sawaki et al. | | |

FOREIGN PATENT DOCUMENTS

| | | |
|---|---|---|
| JP | 2021-20074 A | 2/2021 |
| KR | 20190031943 A | 3/2019 |
| WO | 2019/088273 A1 | 5/2019 |

OTHER PUBLICATIONS

Japanese Office Action issued Nov. 7, 2023, in corresponding Japanese Patent Application No. 2023-510714, 13 pages.
Office Action issued Feb. 18, 2025 in corresponding Japanese Patent Application No. 2024-024798.
Office Action issued Jun. 24, 2025 in corresponding Japanese Patent Application No. 2024-024798.

* cited by examiner

FIG. 8A

| AVATAR ID | FACE PART ID | HAIRSTYLE PART ID | CLOTHING PART ID | · · · |
|---|---|---|---|---|
| A01 | * * * | * * * | * * * | · · · |
| A02 | * * * | * * * | * * * | · · · |
| · · · | · · · | · · · | · · · | · · · |

700

INFORMATION PROCESSING SYSTEM, INFORMATION PROCESSING METHOD, AND INFORMATION PROCESSING PROGRAM

CROSS-REFERENCE AND PRIORITY INFORMATION

The present application is a bypass continuation of and claims priority to PCT/JP2022/009184, filed Mar. 3, 2022, which claims priority to Japanese Application No. JP 2021-057215, filed Mar. 30, 2021, the contents of each are incorporated by reference in their entirety.

BACKGROUND

1. Technical Field

The present disclosure relates to an information processing system, an information processing method, and an information processing program.

2. Description of the Related Art

"Mirrativ" is conventionally known as a service that distributes music and moving images to a plurality of users (e.g., see "Mirrativ", [online], Mirrativ, Inc., [retrieved Dec. 18, 2019], Internet (URL: https://www.mirrativ.com/)).

SUMMARY

In an exemplary implementation of the present disclosure, an information processing system comprises processing circuitry configured to detect a state of a first user that distributes content including an image of a first virtual space, the image including a plurality of layers; display the image, which is viewable by the first user watching the content via a first terminal device relating to the first user or is viewable by a second user watching the content via a second terminal device relating to the second user; and store a first avatar associated with the first user. To display the image, the processing circuitry is configured to generate a first image region of a layer, of the plurality of layers, relating to the first avatar, and generate a second image region of a layer, of the plurality of layers, relating to a first user interface. The processing circuitry is further configured to change a state of the first avatar in the first image region based on the detected state of the first user.

BRIEF DESCRIPTION OF THE DRAWINGS

FIG. 8A is a schematic side view of virtual space corresponding to a distribution image;

DETAILED DESCRIPTION

Conventional technologies may provide services that enable watching in a real space, but expanding into a virtual space is difficult. Accordingly, the inventors developed content distribution technologies as in the present disclosure which are suitable for a virtual space.

According to an aspect of the present disclosure, an information processing system is disclosed that includes a first detecting unit that detects a state of a first user that distributes contents including an image of first virtual space, a first drawing processing unit that draws the image of first virtual space that is viewable by the first user or a second user, via a first terminal device relating to the first user or a second terminal device relating to the second user that watches the contents, and a first storage unit that stores a first display medium associated with the first user. The image of first virtual space has a plurality of hierarchical layers. The first drawing processing unit includes a first drawing unit that draws, out of the plurality of hierarchical layers, a first image region of a layer relating to the first display medium, and a second drawing unit that draws, out of the plurality of hierarchical layers, a second image region of a layer relating to a first user interface. The first drawing unit changes a state of the first display medium in the first image region, on the basis of the state of the first user detected by the first detecting unit.

Embodiments will be described in detail below with reference to the attached drawings.

Figure 1:
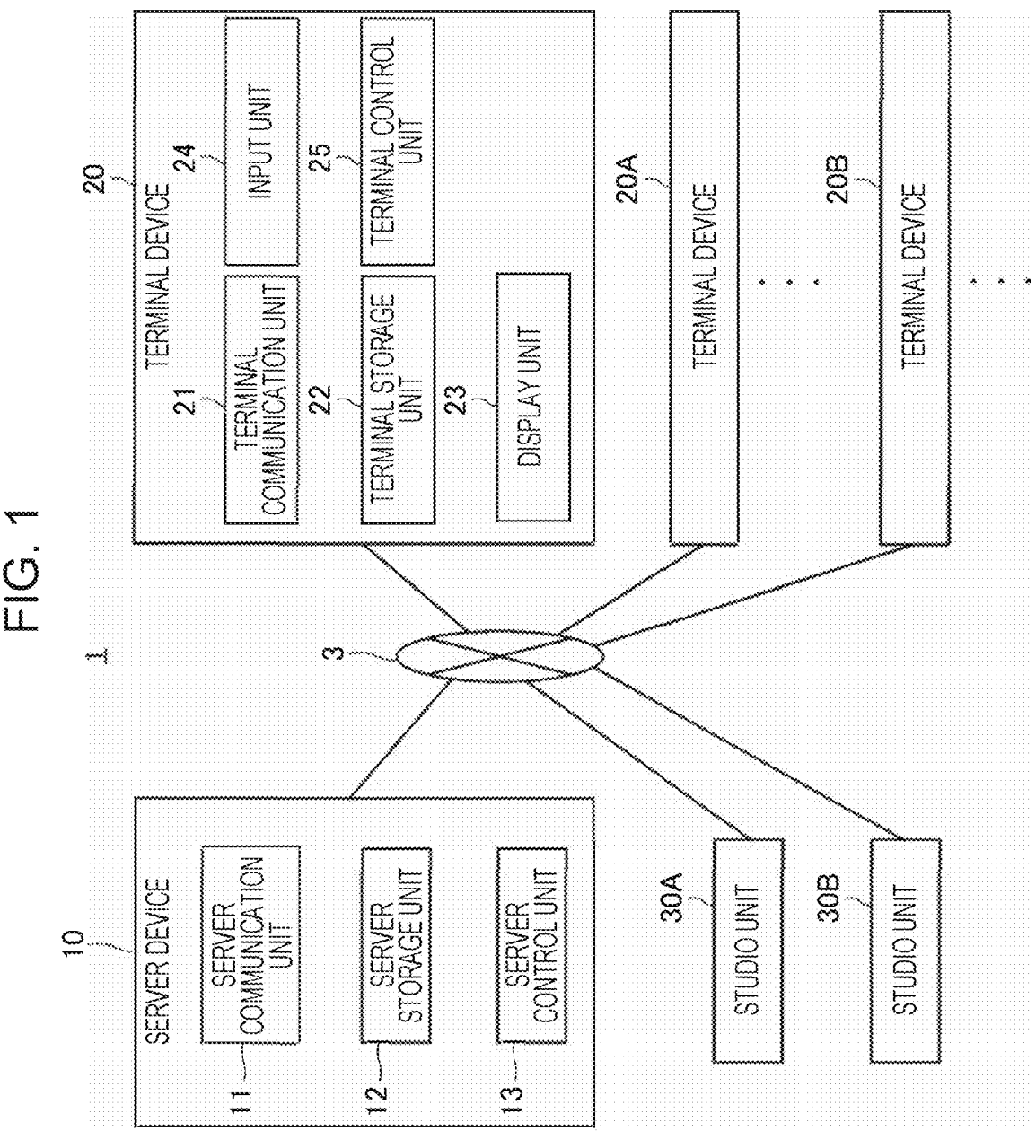
FIG. 1 is a block diagram of a virtual reality generating system according to an embodiment.

An overview of a virtual reality generating system 1 according to an embodiment of the present disclosure will be described with reference to FIG. 1. FIG. 1 is a block diagram of the virtual reality generating system 1 according to the present embodiment.

The virtual reality generating system 1 includes a server device 10 (example of an external processing device) and one or more terminal devices 20. Although three terminal devices 20 are illustrated in FIG. 1 for the sake of convenience, two or more is sufficient for the number of the terminal devices 20.

The server device 10 is an information processing system such as a server or the like that an operator providing one or more virtual realities manages, for example. The terminal device 20 is a device used by a user, such as for example, a mobile telephone, a smartphone, a tablet terminal, a personal computer (PC), a worn device (a head-mounted display, smart-glasses type device, etc.), a gaming device, or the like. The terminal devices 20 typically are of different forms among users, and a plurality thereof can be connected to the server device 10 via a network 3.

The terminal device 20 is capable of executing a virtual reality application according to the present embodiment. The virtual reality application may be received at the terminal device 20 from the server device 10 or a predetermined application distribution server, via the network 3, or may be stored in advance in a storage device included in the terminal device 20 or in a storage medium such as a memory card or the like that is readable by the terminal device 20. The server device 10 and the terminal device 20 are communicably connected via the network 3. For example, the server device 10 and the terminal device 20 collaboratively execute various types of processing relating to virtual reality.

The terminal devices 20 include a terminal device 20A on a contents-distributing side (example of a first terminal device), and a terminal device 20B on a contents-watching side (example of a second terminal device). Note that hereinafter, the terminal device 20A on the contents-distributing side and the terminal device 20B on the contents-watching side will be described as being separate terminal devices, for the sake of convenience in description, but there are cases in which the terminal device 20A on the contents-distributing side becomes the terminal device 20B on the contents-watching side, and vice versa. Note that hereinafter, in a case in which no distinguishment is made between the terminal device 20A and the terminal device 20B in particular, these may be referred to simply as "terminal device 20" in some cases.

The terminal devices 20 are communicably connected to each other via the server device 10. Note that hereinafter, the expression "one terminal device 20 transmits information to another terminal device 20" means "one terminal device 20 transmits information to another terminal device 20 via the server device 10". Similarly, the expression "one terminal device 20 receives information from another terminal device 20" means "one terminal device 20 receives information from another terminal device 20 via the server device 10". Note however that in a modification, the terminal devices 20 may be communicably connected without going through the server device 10. Additionally, the terminal devices 20 may communicate directly (wired or wireless communication)

with each other or the terminal devices 20 may communicate via network 3 without server device 10.

Note that the network 3 may include a wireless communication network, the Internet, a virtual private network (VPN), a wide area network (WAN), a wired network, or any combination thereof, and so forth.

In the example illustrated in FIG. 1, the virtual reality generating system 1 includes studio units 30A and 30B. The studio units 30A and 30B are contents-distributing side devices, in the same way as the terminal device 20A on the contents-distributing side. The studio units 30A and 30B can be placed in studios, rooms, halls, and so forth, for contents production.

The studio units 30 can have the same functions as the terminal device 20A on the contents-distributing side and/or the server device 10. Hereinafter, description will be made primarily regarding a case in which the terminal device 20A on the contents-distributing side distributes various types of contents to the terminal device 20B on the contents-watching side, via the server device 10, for the sake of convenience in description. However, instead of this or in addition to this, by having the same functions as the terminal device 20A on the contents-distributing side, the studio units 30A and 30B illustrated across from the distributing user may distribute various types of contents to each terminal device 20B on the contents-watching side via the server device 10. Note that in a modification, the virtual reality generating system 1 does not need to include the studio units 30A and 30B.

In the following, the virtual reality generating system 1 realizes an example of an information processing system, but individual elements (see terminal communication unit 21 to terminal control unit 25 in FIG. 1) of one particular terminal device 20 may realize an example of an information processing system, or a plurality of terminal devices 20 may collaboratively realize an example of an information processing system. Also, the server device 10 may singularly realize an example of an information processing system, or the server device 10 and one or more terminal devices 20 may collaboratively realize an example of an information processing system.

Now, an overview of virtual reality relating to the present embodiment will be described. The virtual reality according to the present embodiment is virtual reality regarding any realities, such as for example, education, travel, roleplaying, simulation, entertainment such as games and concerts, and so forth, and virtual reality mediums like avatars are used to carry out the virtual reality. For example, the virtual reality according to the present embodiment, is realized by three-dimensional virtual space, various types of virtual reality mediums appearing in this virtual space, and various types of contents provided in this virtual space.

Virtual reality mediums are electronic data used in the virtual reality, and include any medium, such as for example, cards, items, points, in-service currencies (or in-virtual-reality currencies), tickets, characters, avatars, parameters, and so forth. Also, virtual reality mediums may be virtual reality related information, such as level information, status information, parameter information (power value, attack capabilities, etc.) or capability information (skill, ability, incantation, job, etc.). Also, virtual reality mediums are electronic data that can be obtained, possessed, used, managed, traded, composited, strengthened, sold, discarded, gifted, or the like, by the user in virtual reality, but the usage forms of the virtual reality mediums are not limited to those explicitly set forth in the present specification.

In the present embodiment, users include watching users (example of a second user) that watch various types of contents in the virtual space and distributing users (example of a first user) that distribute particular contents, which will be described later, via a distributor avatar M2 (example of a first display medium) in the virtual space. In the present application, a "display medium" may refer to (but is not limited to) one or more avatar(s), character object(s), icon(s) or other visual objects for display output. Additionally, the display medium (e.g., avatar) may be drawn and/or generated according to stored data such as drawing information for watch avatar M1 and distributor avatar M2. The display medium may be drawn and/or generated according to a cloud processing whether or not the data is stored on a terminal side. Image data of the display medium may be stored in or in conjunction with an application installed in the terminal. When the terminal receives identification information specifying the display medium, the image data corresponding to the identification information is called up and the display medium is displayed. In other words, the image data itself is not sent and received between the terminal and the server.

Note that the distributing user can watch particular contents by other distributing users, as watching users, and conversely, watching users can also be distributing users and distribute particular contents. Note however that hereinafter, a watching user is a watching user at that time, and a distributing user is a distributing user at that time, in order to prevent description from becoming complicated. Note that hereinafter, in a case in which no distinguishment is made between watching users and distributing users in particular, these may be referred to simply as "users" in some cases. Also, in a case in which no distinguishment is made between a watcher avatar M1 relating to a watching user (example of a second display medium) and the distributor avatar M2 in particular, these may be referred to simply as "avatar" in some cases.

Note that an avatar typically is in a form of a character having a frontal direction, and may have a form of a person, an animal, or the like. An avatar can have various appearances (appearances when drawn) by being associated with various types of avatar items.

Watching users and distributing users basically each wear a worn device on part of the head or face, for example, and view the virtual space via the worn device. Note that the worn device may be a head-mounted display or a smart-glasses type device. The smart-glasses type device may be so-called augmented reality (AR) glasses or mixed reality (MR) glasses. In either case, the worn device may be separate from the terminal device 20 or may realize part or all of the functions of the terminal device 20. In the present embodiment, the terminal device 20 is realized by a head-mounted display, as an example.

Hereinafter, description will be made primarily regarding particular contents by distributing users, out of various types of contents that the server device 10 distributes. Also hereinafter, contents that are suitably watched through a head-mounted display will be described.

Particular contents by a distributing user refer to contents in which the distributor avatar M2 relating to the distributing user is a distributor avatar M2 that changes orientation, position, movement, and so forth, in accordance with orientation, position, movement, and so forth of the distributing user, appears in the virtual space. Note that the orientation, position, and movement, of the distributing user is not limited to the orientation, position, and movement, of part or all of the body of the distributing user, such as face, hands, and so forth, but is a concept including the orientation, position, movement, or the like of the line of sight of the distributing user. Particular contents by a distributing user typically are moving image contents.

Particular contents by a distributing user typically are provision of entertainment of any form via the distributor avatar M2. For example, particular contents by a distributing user may be related to various types of performances such as dance, music, magic, or the like, or chats, assemblies, meetings, conferences, or the like.

Particular contents by a distributing user may also be education-related. For example, particular contents by a distributing user may include instructions, advice, and so forth, from the distributing user via the distributor avatar M2. For example, instructions, advice, and so forth from a dance teacher may be included as contents provided in virtual reality relating to dance lessons. In this case, the dance teacher is the distributing user, a student is the watching user, and the student can individually receive instructions from the teacher in the virtual reality.

Also, particular contents by a distributing user may include a form of collaboration (hereinafter abbreviated to "collab") by two or more distributing users. This enables various forms of distribution, thereby promoting interchange among distributing users.

Note that the server device 10 can also distribute contents other than particular contents by distributing users. Although any type and number of contents may be provided by the server device 10 (contents provided in virtual reality), in the present embodiment, the contents provided by the server device 10 may include digital contents such as various types of videos, as an example. Videos may be real-time videos, or may be non-real-time videos. Also, videos may be videos based on actual images, or may be videos based on computer graphics (CG). The videos may be videos for providing information. In this case, the videos may be information providing services regarding particular genres (information providing services relating to travel, home, food, fashion, health, beauty, and so forth), broadcasting services by particular users (e.g., YouTube (registered trademark)), or the like.

The forms of providing contents in virtual reality are varied, and may include forms other than those provided using display functions of a head-mounted display. For example, in a case in which the contents are video, providing of the contents may be realized by drawing the video on a display of a display device (virtual reality medium) in virtual space. Note that the display device in the virtual space may be in any form, and may be a screen installed in the virtual space, a large-screen display installed in the virtual space, a display of a mobile terminal in the virtual space, or the like.

Also, the contents in virtual reality may be watchable by a method other than via a head-mounted display. For example, the contents in virtual reality may be directly watched (without going through a head-mounted display) via a smartphone, a tablet, or the like.

Configuration of Server Device

A configuration of the server device 10 will be described in detail. The server device 10 is made up of a server computer. The server device 10 may be realized by collaboration among a plurality of server computers. For example, the server device 10 may be realized by collaboration among a server computer that provides various types of contents, a server computer that realizes various types of authentication servers, and so forth. Also, the server device 10 may include a Web server. In this case, part of the functions of the terminal device 20, which will be described later may be realized by a browser processing HyperText Markup Language (HTML) documents received from the Web server and various types of accompanying programs (JavaScript).

The server device 10 includes a server communication unit 11, a server storage unit 12, and a server control unit 13, as illustrated in FIG. 1.

The server communication unit 11 communicates with external devices by wired or wireless communication, and includes an interface for performing transmission and reception of information. The server communication unit 11 may include, for example a wireless local area network (LAN) communication module, a wired LAN communication module, or the like. The server communication unit 11 is capable of exchanging information with the terminal devices 20 via the network 3.

The server storage unit 12 is a storage device for example, and stores various types of information and programs that are necessary for various types of processing relating to virtual reality.

The server control unit 13 may include a dedicated microprocessor, or a central processing unit (CPU) or graphics processing unit (GPU) or the like for realizing particular functions by reading in particular programs. For example, the server control unit 13 collaborates with the terminal device 20 to execute a virtual reality application in accordance with user operations performed at a display unit 23 of the terminal device 20. In an exemplary implementation, server device 10 and/or its components (server communication unit 11, server storage unit 12, sever control unit 13) may be implemented using circuitry or processing circuitry as will be discussed later with respect to FIG. 22.

Configuration of Terminal Device

A configuration of the terminal device 20 will be described. The terminal device 20 includes the terminal communication unit 21, a terminal storage unit 22, the display unit 23, an input unit 24, and the terminal control unit 25, as illustrated in FIG. 1. In an exemplary implementation, terminal device 20 and/or its components (terminal communication unit 21, a terminal storage unit 22, the display unit 23, an input unit 24, and the terminal control unit 25) may be implemented using circuitry or processing circuitry as will be discussed later with respect to FIG. 22.

The terminal communication unit 21 performs communication with an external device by wireless or wired communication, and includes an interface of performing transmission and reception of information. The terminal communication unit 21 may include a wireless communication module corresponding to a mobile communication standard such as, for example, long-term evolution (LTE) (registered trademark), LTE Advanced (LTE+), fifth generation mobile communication technology standard (5G), Ultra Mobile Broadband (UMB), and so forth, a wireless LAN communication module, a wired LAN communication module, or the like. The terminal communication unit 21 is capable of exchanging information with the server device 10 via the network 3.

The terminal storage unit 22 includes, for example, a primary storage device and a secondary storage device. The terminal storage unit 22 may include, for example, semiconductor memory, magnetic memory, optical memory, or the like. The terminal storage unit 22 stores various types of information and programs used for processing of virtual reality, which are received from the server device 10. The information and programs used for processing of virtual reality may be acquired from an external device via the terminal communication unit 21. For example, a virtual reality application program may be acquired from a predetermined application distribution server. Hereinafter, application programs will be referred to simply as "applications".

Also, the terminal storage unit 22 stores data for drawing virtual space, such as for example, indoor space of buildings or the like, images of outdoor space, and so forth. Note that a plurality of types of data for drawing virtual space may be provided for each virtual space, and used separately depending on situations.

Also, the terminal storage unit 22 stores various types of images (texture images) to be projected (texture mapping) on various types of objects placed in the three-dimensional virtual space.

For example, the terminal storage unit 22 stores drawing information for watcher avatars M1 serving as virtual reality mediums associated with each user. Watcher avatars M1 are drawn in the virtual space on the basis of the drawing information of the watcher avatars M1.

Also, the terminal storage unit 22 stores drawing information for distributor avatars M2 serving as virtual reality mediums associated with respective distributing users. Distributor avatars M2 are drawn in the virtual space on the basis of the drawing information of the distributor avatars M2.

Also, the terminal storage unit 22 stores drawing information relating to various types of objects that are different from the watcher avatars M1 and the distributor avatars M2, such as for example, various types of gift objects, buildings, walls, non-player characters (NPCs), and so forth. The various types of objects are drawn in the virtual space on the basis of this drawing information. Note that gift objects are objects corresponding to gifts (presents) from one user to another user, and are part of items. Gift objects may be things worn on the body of the avatar (clothing or accessories), things to decorate distribution images (fireworks, flowers, etc.), backgrounds (wallpaper) or the like, tickets for opening a loot box (drawings), or the like.

The display unit 23 includes display devices such as, for example, liquid crystal displays, organic electroluminescent (EL) displays, and so forth. The display unit 23 is capable of displaying various types of images. The display unit 23 is made up of a touch panel, for example, and functions as an interface that detects various types of user operations. Note that the display unit 23 may have a form of being built into a head-mounted display, as described above.

The input unit 24 may include physical keys, and may further include any input interface, such as a pointing device like a mouse or the like. The input unit 24 may also be capable of accepting non-contact user input, such as sound input, gesture input, or gaze-tracking input. Note that sound input may be any sound including voice, speech or other audio. Additionally, note that gesture input may use sensors for detecting various types of states of the user (image sensors, acceleration sensors, distance sensors, etc.), dedicated movement capturing in which sensor technology and cameras are integrated, controllers such as joypads, and so forth. Also, a camera for detecting the line of sight may be placed within the head-mounted display. Note that as described above, the various states of the user are, for example, the orientation, position, movement, and so forth of the user, or the like, and in this case, the orientation, position, and movement of the user is a concept that is not limited to the orientation, position, movement, of the hands or body of the user, and includes the orientation, position, movement, or the like of the line of sight of the distributing user.

The terminal control unit 25 includes one or more processors. The terminal control unit 25 controls the actions of the entire terminal device 20.

The terminal control unit 25 performs transmission and reception of information via the terminal communication unit 21. For example, the terminal control unit 25 receives various types of information and programs used for various types of processing relating to virtual reality from at least one of the server device 10 and another external server. The terminal control unit 25 stores the information and programs that are received in the terminal storage unit 22. For example, the terminal storage unit 22 may store a browser (Web browser) for connecting to a Web server.

The terminal control unit 25 activates a virtual reality application in accordance with operations of the user. The terminal control unit 25 executes various types of processing relating to virtual reality in collaboration with the server device 10. For example, the terminal control unit 25 displays an image of virtual space on the display unit 23. A graphical user interface (GUI) that detects user operations, for example, may be displayed on the screen. The terminal control unit 25 is capable of detecting user operations via the input unit 24. For example, the terminal control unit 25 is capable of detecting various types of operations through gestures of the user (operations corresponding to tap operations, long-tap operations, flick operations, swipe operations, and so forth). The terminal control unit 25 transmits operation information to the server device 10.

Figure 2:
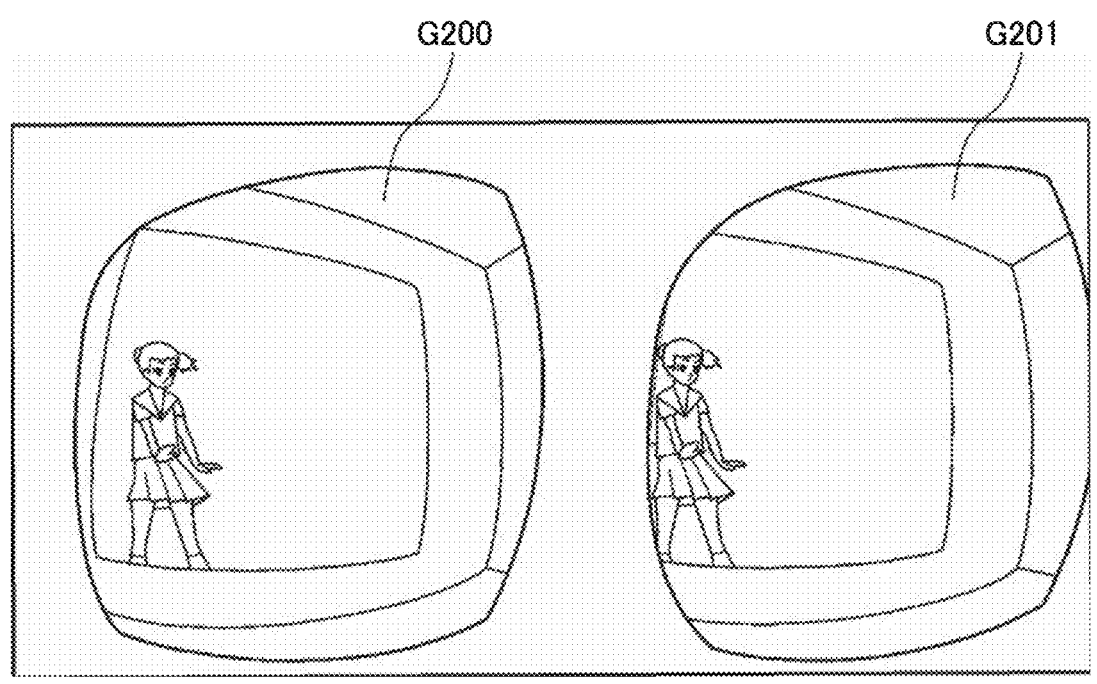
FIG. 2 is an explanatory diagram of images that are respectively viewed by the left and right eyes.

The terminal control unit 25 draws the distributor avatar M2 and so forth along with the virtual space (image), and performs display thereof on the display unit 23. In this case, for example, images G200 and G201 that are respectively viewed by the left and right eyes, may be generated to generate a three-dimensional image, as illustrated in FIG. 2. FIG. 2 schematically illustrates the images G200 and G201 that are respectively viewed by the left and right eyes. Note that hereinafter, "image of virtual space" refers to the entire image expressed by the images G200 and G201, unless stated otherwise in particular. Also, the terminal control unit 25 realizes various types of movement of the distributor avatar M2 within the virtual space, in accordance with various types of operations performed by the distributing user, for example. Specific drawing processing by the terminal control unit 25 will be described later.

Figure 3:
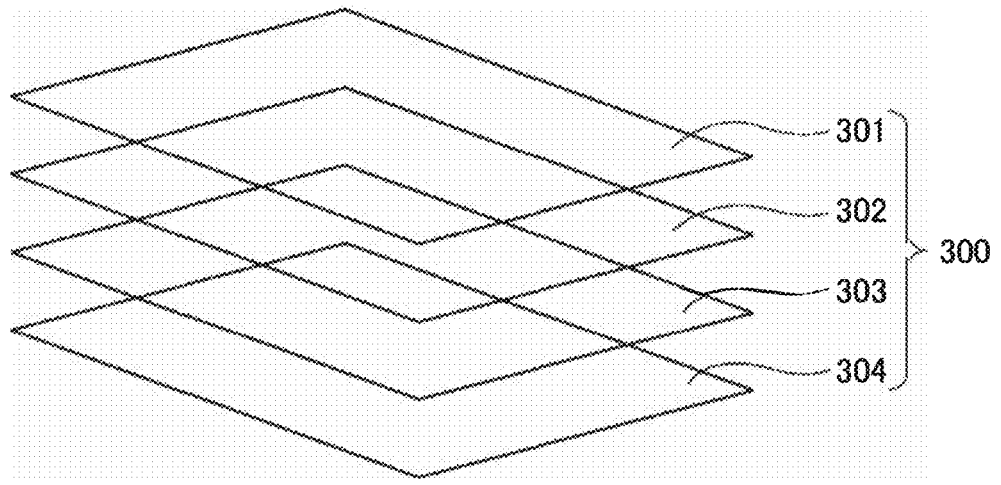
FIG. 3 is an explanatory diagram of a structure of an image in virtual space according to the embodiment.

FIG. 3 is an explanatory diagram of a structure of an image in virtual space according to the present embodiment.

In the present embodiment, an image of virtual space has a plurality of layers 300, as schematically illustrated in FIG. 3. In this case, the terminal control unit 25 draws an image region of each layer, and overlays the image regions of the layers, thereby generating the image of virtual space. Note that the hierarchical 300 are made up of four layers 301 to 304 in the example illustrated in FIG. 3, but any number of layers may be employed. In an exemplary implementation, layers 300 may be hierarchical and/or ordered in structure, but they are not limited to such structure, and each layer layers 300 may have a same or different level or importance as other layers in layer 300.

The plurality of layers may include a combination of any two or more of a distributing avatar display layer J0 in which the distributor avatar M2 is displayed, a user avatar display layer J1 in which the watcher avatar M1 is displayed, an interface display layer J2 in which the user interface is displayed, a background layer J3, an auxiliary information display layer J5 in which various types of auxiliary information are displayed, and other such layers.

Hereinafter, the reference for a fore and aft relation (or behind) of the plurality of layers is the viewpoint of the user viewing the image of virtual space, and also, the reference for the distance relation among the layers is the distance following the direction of the line of sight of the user viewing the image of virtual space.

In a case in which the plurality of layers includes the background layer J3, the background layer J3 is the layer farthest behind, but the fore and aft relation of other layers may be set as appropriate. For example, in a case in which a plurality of layers relating to a certain image of virtual space include the distributing avatar display layer J0, the interface display layer J2, the background layer J3, and the auxiliary information display layer J5, in this case, the distributing avatar display layer J0, the interface display layer J2, the auxiliary information display layer J5, and the background layer J3 may be included in this order from the foreside.

The interface display layer J2 is a layer relating to the input unit 24 that is described above, and is capable of accepting non-contact user input. The interface display layer J2 preferably is placed at a distance that can be reached by the hands of the user within the virtual space (i.e., an operable distance). Accordingly, the user is capable of performing various types of input without relocating through the virtual space while wearing the head-mounted display, and can perform various types of input via the interface display layer J2 in a form in which simulator sickness does not readily occur.

The auxiliary information display layer J5 preferably is placed behind the interface display layer J2. In this case, the auxiliary information display layer J5 is placed at a distance that the hands of the user in the virtual space cannot reach (cannot reach without relocating). Thus, the visibility of the interface display layer J2 can be increased as compared to a case in which the auxiliary information display layer J5 is placed on the foreside of the interface display layer J2.

Any auxiliary information may be displayed in the auxiliary information display layer J5, and may include, for example, at least one of input information from a watching user of particular contents (i.e., a watching user that is watching the particular contents), guidance/notification information to the distributing user and/or other users, and item information including gift objects sent to the distributing user.

Note that the auxiliary information display layer J5 may be made up of a plurality of layers, in a form in which a different layer is formed for each attribute of the auxiliary information. For example, the auxiliary information display layer J5 in which a gift object is drawn may be set to be separate from other auxiliary information display layers J5. In this case, an auxiliary information display layer J5 in which a gift object is drawn may be placed behind the distributing avatar display layer J0, closer to the distributing avatar display layer J0 than another auxiliary information display layer J5. Alternatively, the auxiliary information display layer J5 in which a gift object is drawn may be placed to the foreside of the distributing avatar display layer J0, unlike other auxiliary information display layers J5.

The background layer J3 may have a function of bounding a boundary (outer envelope) on an outer side of the virtual space. Note that the virtual space may be infinite space that substantially does not have the background layer J3, or may be cylindrical or celestial-sphere-like space.

Example of Virtual Space

The server control unit 13 collaborates with the terminal device 20 to display images of virtual space on the display unit 23, and to update the images of the virtual space in accordance with progress of the virtual reality and user operations.

Note that the drawing processing described below is realized by the terminal device 20, but in another embodiment, part or all of the drawing processing described below may be realized by the server control unit 13. For example, in the following description, at least part of images of virtual space displayed at the terminal device 20 may be displayed as Web display that is displayed at the terminal device 20 on the basis of data generated by the server device 10, and at least part of the images may be displayed as native display by a native application installed in the terminal device 20.

Now, several examples of images of virtual space generated by the virtual reality generating system 1 will be described with reference to FIGS. 4 to 14.

Figure 4:
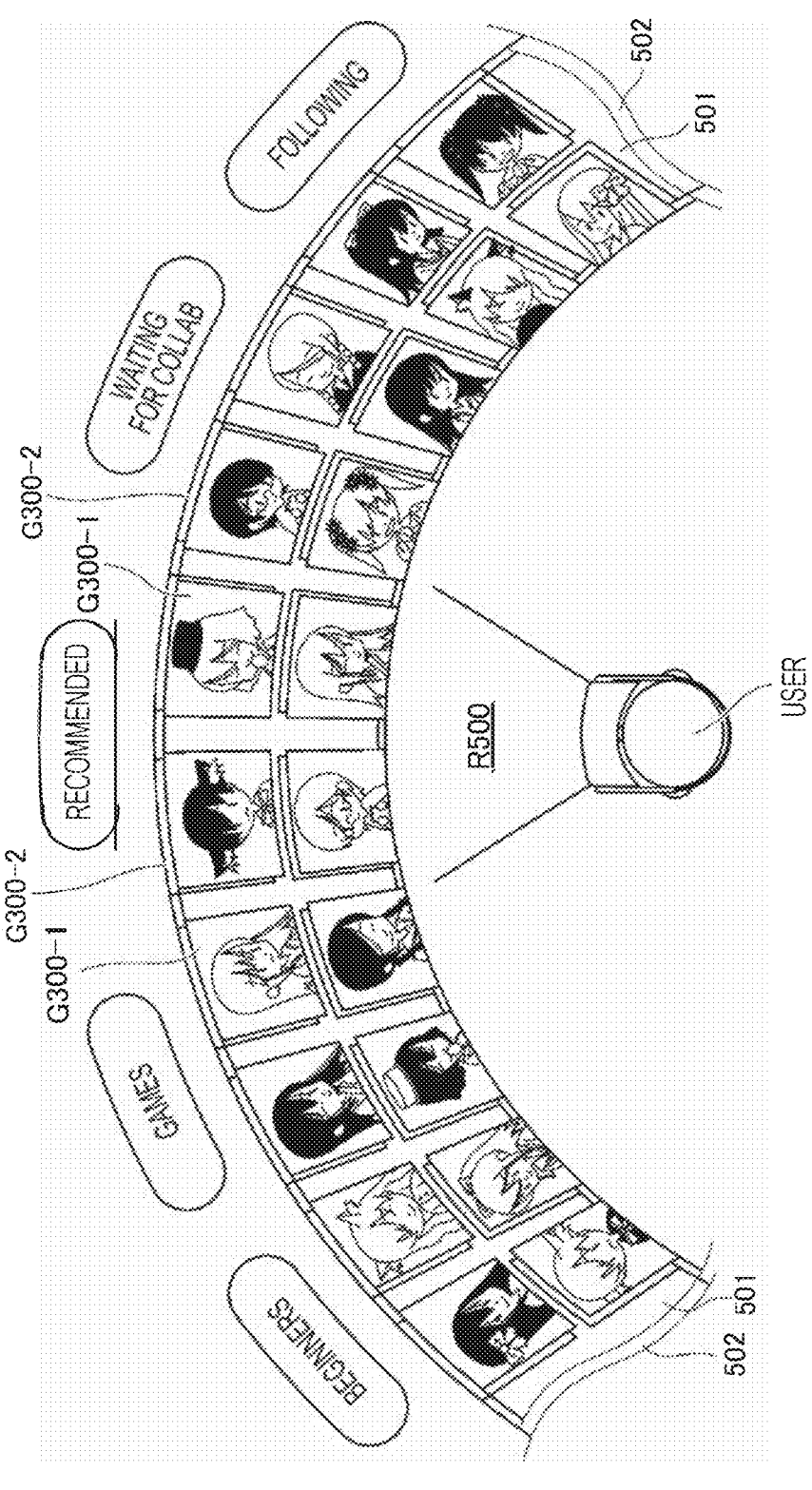
FIG. 4 is an explanatory diagram of virtual space corresponding to a home screen (lobby screen)
Figure 5A:
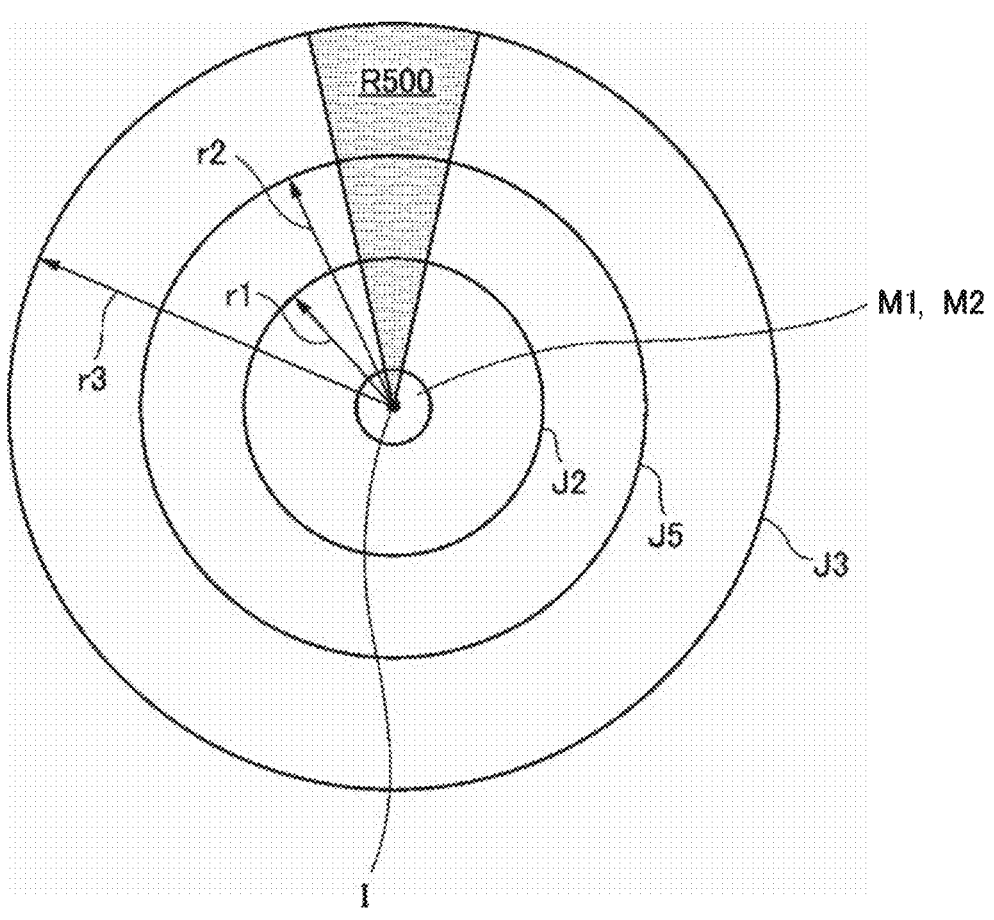
FIG. 5A is an explanatory diagram of a structure of a home image.
Figure 5B:
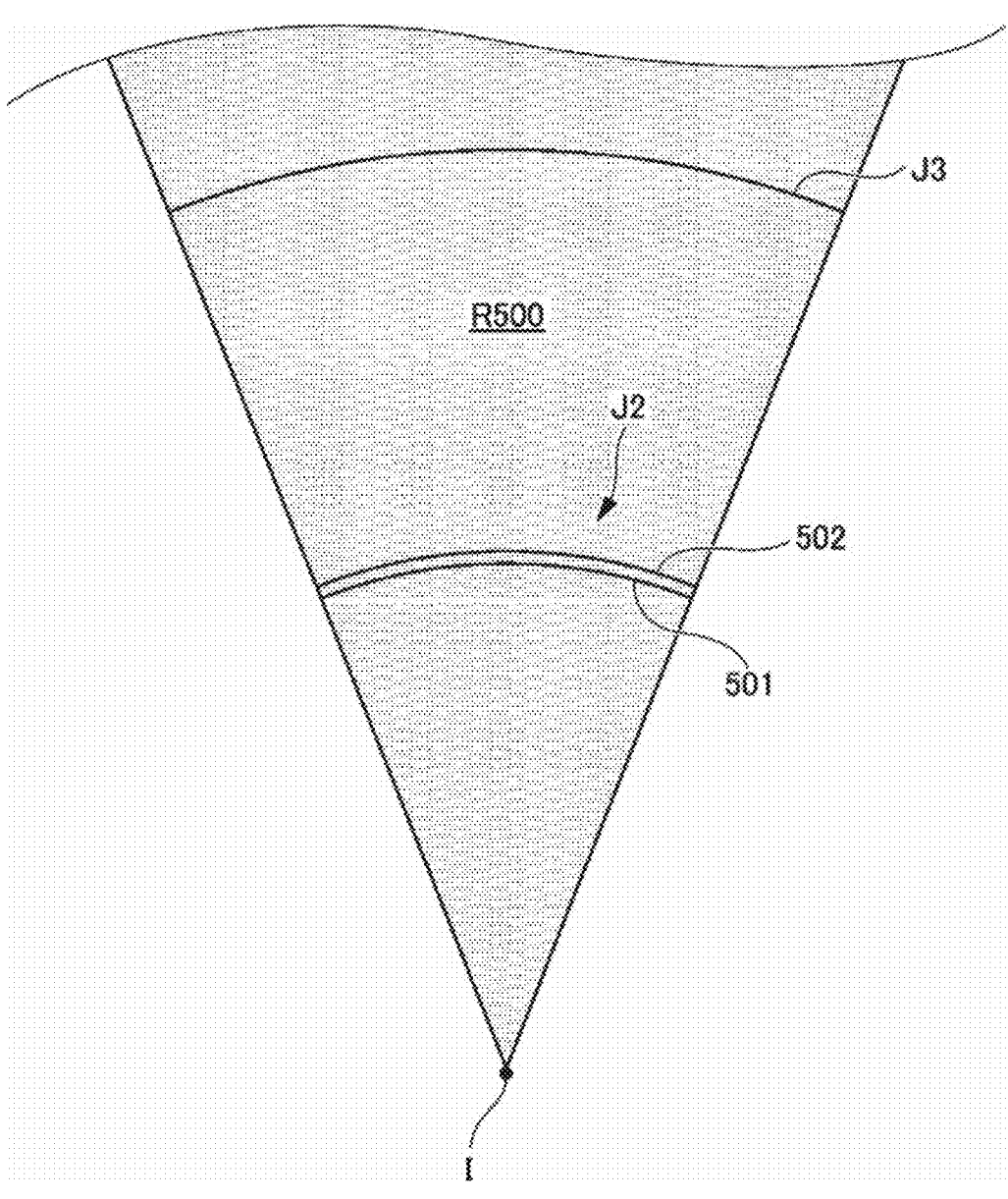
FIG. 5B is an enlarged diagram of a field-of-view range from a viewpoint of a user in FIG. 5A (in a case of viewing frontward)
Figure 6:
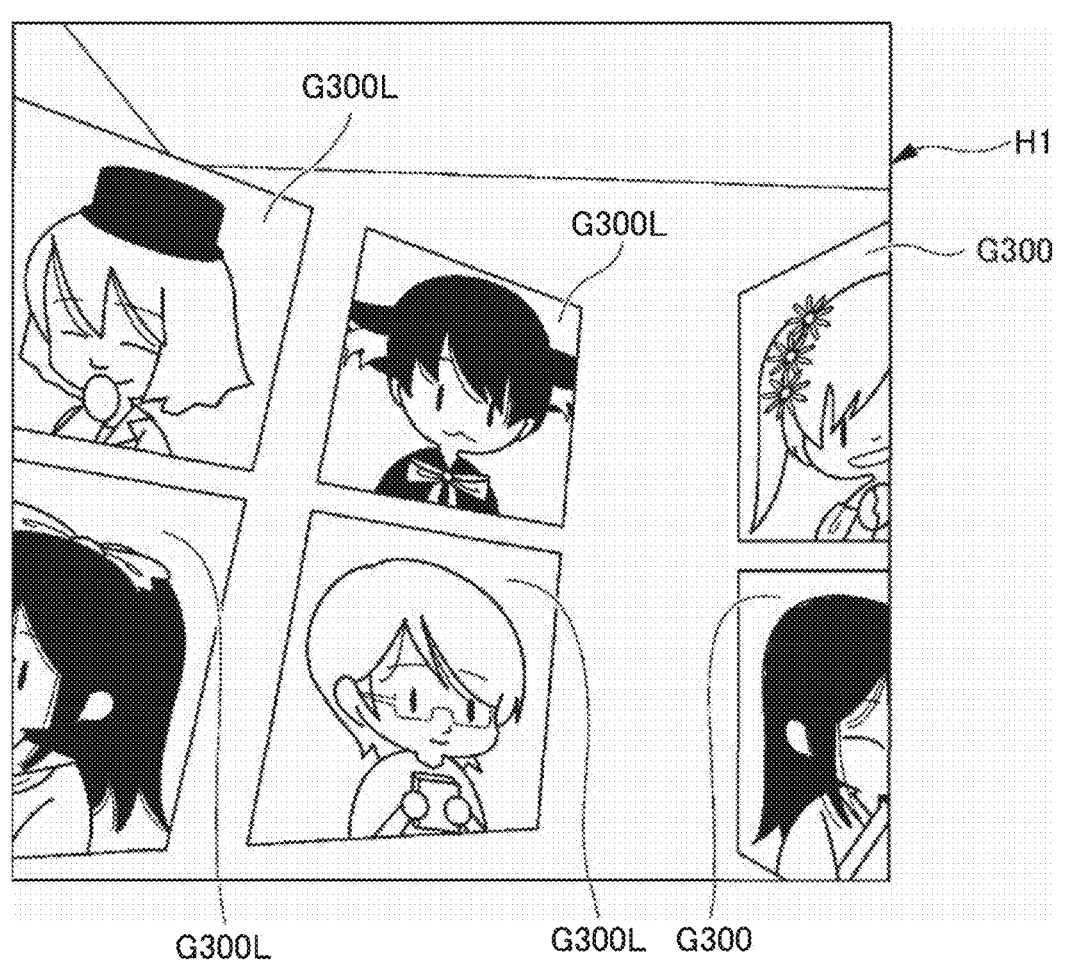
FIG. 6 is a diagram illustrating an example of the home screen as viewed from a worn device.
Figure 7A:
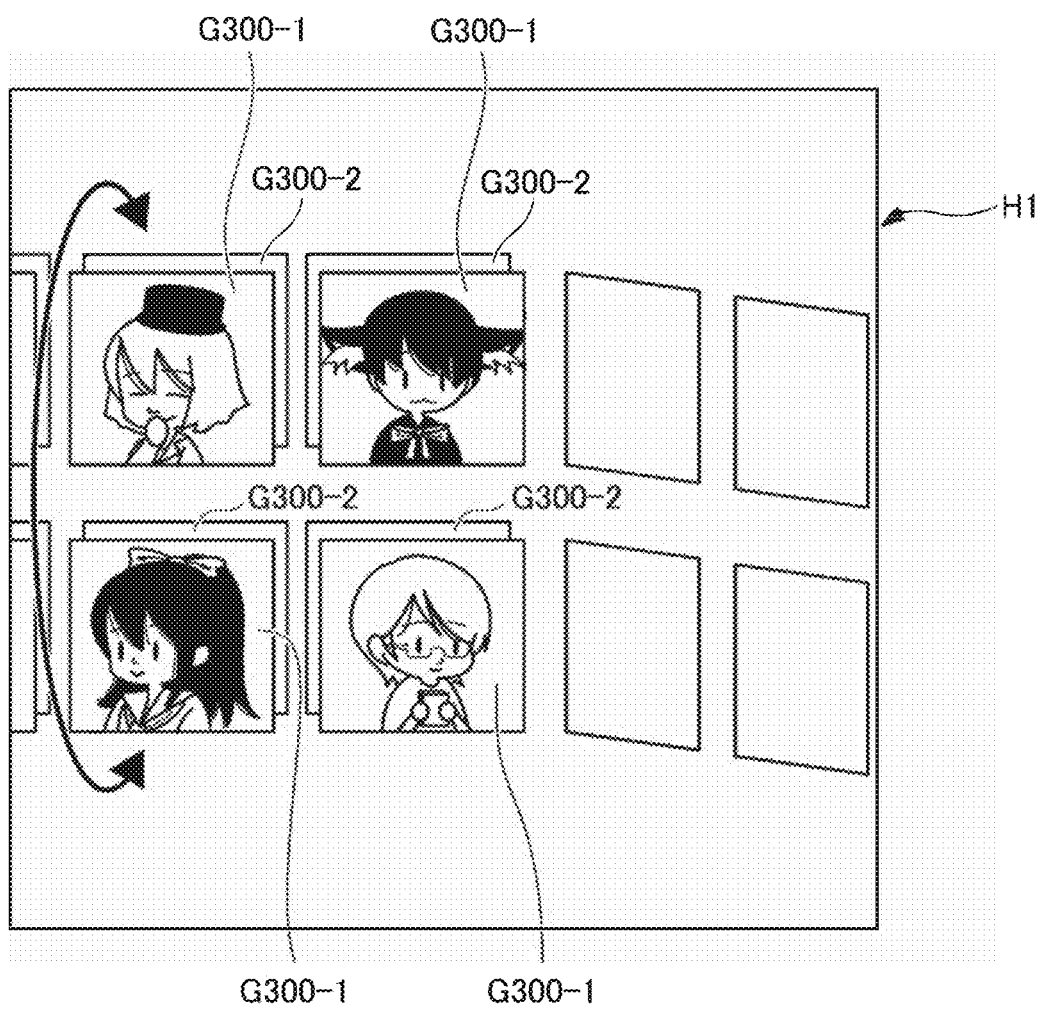
FIG. 7A is an explanatory diagram of a form in which fore and aft of operating regions are switched.
Figure 7B:
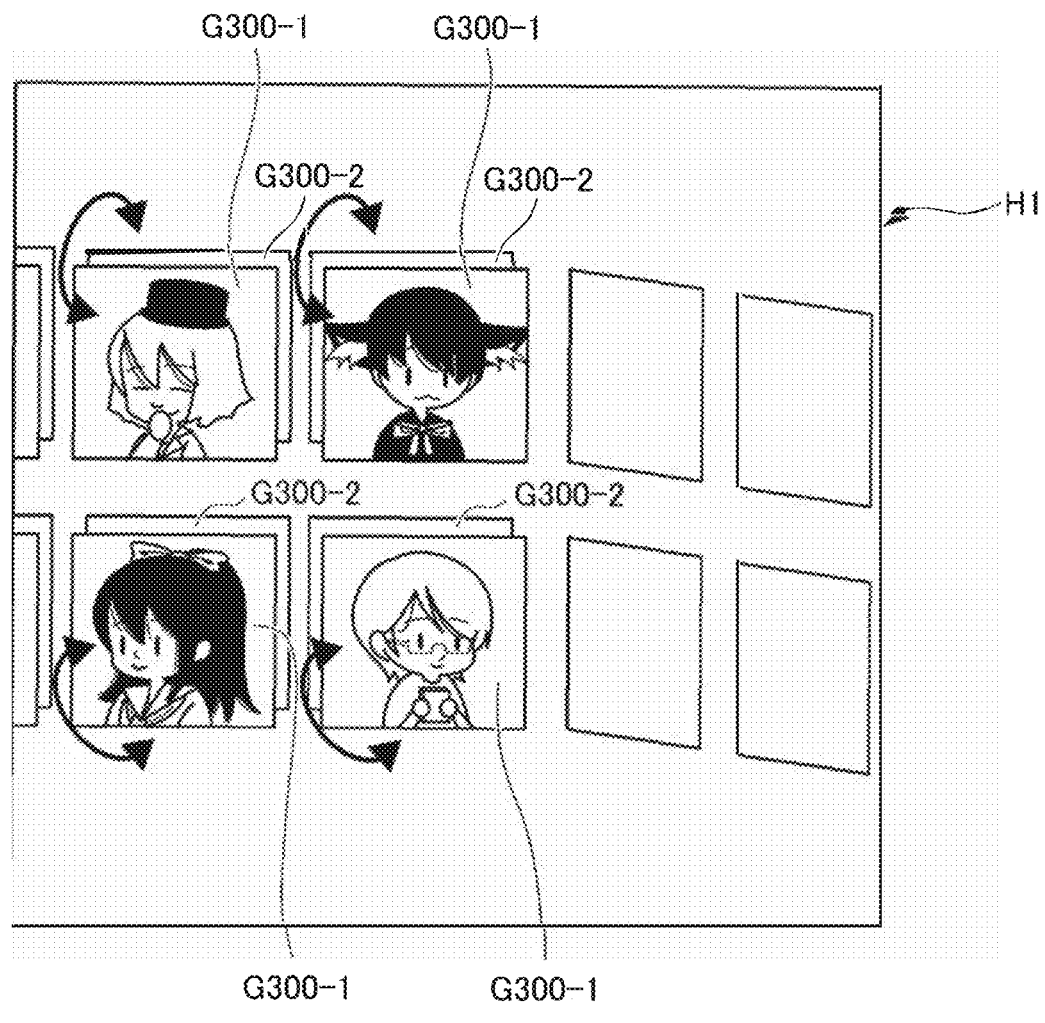
FIG. 7B is an explanatory diagram of a form in which the fore and aft of operating regions are switched.

FIG. 4 is an explanatory diagram of virtual space corresponding to a home screen (lobby screen). FIG. 5A is an explanatory diagram of a structure of an image that is the home screen (hereinafter referred to as "home image H1"). FIG. 5B is an enlarged diagram of a field-of-view R500 from a viewpoint of a user in FIG. 5A (in a case of viewing frontward). FIG. 6 is a diagram illustrating an example of the home image H1 as viewed from a head-mounted display. FIGS. 7A and 7B are explanatory diagrams of forms in which fore and aft of operating regions are switched.

The home image H1 represents a virtual space that serves as an entrance to relocate to various types of virtual spaces (hereinafter referred to as "home space"). FIG. 4 schematically illustrates users situated within the home space. Operating regions G300 for selecting from various types of contents are placed in the home space, which will be described later. In the home space, users can perform various types of activities, such as watching particular contents by preferred distributing users, the users themselves becoming distributing users and distributing particular contents, distributing particular contents in a form of collaboration with other users (hereinafter referred to "collab distribution"), and so forth.

In the present embodiment, as an example, the home image H1 includes, in order from the foreside, the interface display layer J2 (example of a layer relating to a second user interface), the auxiliary information display layer J5, and the background layer J3. Note that in a modification, other layers such as described above may be included, and part of the layers (e.g., auxiliary information display layer J5 and background layer J3) may be omitted.

FIG. 5A illustrates a placement example of the interface display layer J2, the auxiliary information display layer J5, and the background layer J3, along with a predetermined reference axis I that passes through the position of a user (position of watcher avatar M1 or distributor avatar M2), as viewed from above. In the present specification viewing from above means viewing from above with an up-down direction in the virtual space as a reference, unless stated otherwise in particular.

In the present embodiment, as illustrated in FIG. 5A, the interface display layer J2, the auxiliary information display layer J5, and the background layer J3 are placed around the predetermined reference axis I in a form of making up surfaces of cylinders having different radii r1, r2, and r3, the radii r1, r2, and r3 corresponding to the distance between each layer and the user, as viewed from above. Note that the radius r3 relating to the background layer J3 may be infinite (at infinity). Also, the radius r1 of the interface display layer J2 may be set to be within a range that can be reached by the hands of the user, as described above. Also, the radius r1 may be adjustable by each user. Accordingly, the interface display layer J2 can be formed at a sense of distance in accordance with the length of the arms of the user, and the preferences thereof.

The interface display layer J2 preferably is placed with the position of the user in the home space as a reference. In other words, when the user enters the home space, the user is positioned at a predetermined positional relation as to the interface display layer J2. In the present embodiment, with the position of the user in the home space as a reference, the interface display layer J2 is placed within a range that can be reached by the hands of the user at that position. Accordingly, the user is capable of performing various types of input without relocating through the virtual space while wearing the head-mounted display, and can perform various types of input via the interface display layer J2 in a form in which simulator sickness does not readily occur.

The interface display layer J2 preferably includes a plurality of operating regions G300 that are planar in form, which function as the input unit 24. In this case, the plurality of operating regions G300 that are planar in form are capable of functioning as selection buttons that are selectable by the user. Note that the operating regions G300 that are planar in form may be any size and shape, and may differ in accordance with the attributes of the operating regions G300. Thus, the user can identify the operating regions G300 for each attribute more readily.

In this case, any of various types of processing may be realized by operating the operating region G300 (example of various types of second processing), and may include, for example, processing of changing placements of user interfaces (e.g., the plurality of operating region G300 that are planar in form), processing of the user relocating to any location or a particular location in the virtual space (e.g., processing of causing a distributing user to relocate to a location for distributing), processing to start distribution of various types of contents, processing to start watching various types of contents, processing to end watching various types of contents, sound input processing, processing of sending gifts to distributing users, processing of holding drawings for avatar items, processing for selecting/exchanging avatar items, processing for text input, processing for transitioning to a state in which one of the above processing can be executed, or any combination thereof. Note that sound input processing includes the processing of sounds such as voice, speech or other audio. Later references to may refer to speech or processing such as speech input processing, and such references may further include other types of sounds such as voice and other audio and other types of sound processing such as voice processing and other audio processing. Thus, the user can realize various types of operation via the interface display layer J2.

The plurality of operating regions G300 that are planar in form, which are associated with processing to start watching contents may be drawn in a form associated with what is in selection candidate contents or the like. For example, a thumbnail image or a real-time video of selection candidate contents (e.g., particular contents by distributing users) may be drawn for each of the operating region G300 (see FIG. 4). Also, distributor avatars M2 of a plurality of distributing users performing this collab distribution may be drawn in thumbnails for collab distribution. Accordingly, users can easily comprehend what sort of contents can be watched, and easily select a desired operating region G300 (e.g., an operating region G300 related to desired particular contents).

Also, the plurality of operating regions G300 that are planar in form are preferably placed in a form making up a plurality of rows, as illustrated in FIG. 4. Accordingly, a great number of operating regions can be efficiently placed within a range that can be viewed by the user, even in a case in which the number of the operating regions G300 that are planar in form increases due to an increase in the number of distributing users (and accordingly an increase in particular contents being distributed) and so forth, for example.

In this case, at least part of the plurality of operating regions G300 that are planar in form are placed in a plurality of rows following a first curved face 501 (see FIGS. 4 and 5B) around the predetermined reference axis I. The predetermined reference axis I is an axis that passes through the position of the user, and extends in the up-down direction of the home space. At this time, the first curved face 501 may be a circular form that forms the interface display layer J2, and the center of curvature may be situated on the predetermined reference axis I, when viewing the home space from above. Note however that in a modification, the first curved face 501 may have a form that is elliptical or the like, when viewing the home space from above. Accordingly, the user can see the plurality of operating regions G300 that are planar in form at equal distances from him/herself at the center, thereby improving operability. Note that the operating regions G300 that are planar in form being placed following the first curved face 501 may be a form in which, when viewing the home space from above, in-plane directions relating to the planar forms of the operating regions G300 are parallel to tangential directions of the first curved face 501. Alternatively, a form may be made in which, in a case in which the radius of curvature of the first curved face 501 is sufficiently small, the operating regions G300 are projected onto the first curved face 501.

Also, the plurality of operating regions G300 that are planar in form preferably may be placed in a form of collections according to each category. For example, operating regions G300 relating to a category "recommended" for the user are placed in a region that follows the first curved face 501 and that is a region at the front as viewed from the viewpoint of the user, and other categories (e.g., "waiting for collab", "games", "beginners", "following", and so forth) may be placed to the left and right sides to the region at the front. Such placement of the operating regions G300 may be customized by each user, in a form like placement of icons for various types of apps on a smartphone screen. FIG. 4 schematically illustrates the region R500 being the region at the front as viewed from the viewpoint of the user (see FIG. 5). The home image H1 is generated on the basis of the region at the front as viewed from the viewpoint of the user. Note that the position of the region R500 at the front as viewed from the viewpoint of the user may change in accordance with the direction of the line of sight or the orientation of the face of the user changing. Accordingly, the consistency of change of the field of view in real space and the change of the field of view in virtual space can be increased.

Also, the plurality of operating regions G300 that are planar in form are preferably placed in a form having a plurality of layers, fore and aft. For example, the plurality of operating regions G300 that are planar in form may include a first group placed as a plurality of rows following the first curved face 501 around the predetermined reference axis I, and a second group placed as a plurality of rows following a second curved face 502 around the predetermined reference axis I. In this case, the second curved face 502 may be offset behind as to the first curved face 501, as illustrated in FIG. 4. In this case, the second group of the plurality of operating regions G300 that is placed following the second curved face 502 (hereinafter also referred to as "operating regions G300-2" to distinguish from the first group) is behind the first group of the plurality of operating regions G300 that is placed following the first curved face 501 (hereinafter also referred to as "operating regions G300-1" to distinguish from the second group), in an overlapping relation, as viewed from the viewpoint of the user. At this time, the operating regions G300-2 of the second group may be partially visible from behind the operating regions G300-1 of the first group, as viewed from the viewpoint of the user. In this case, the user can be made to know of the presence of the operating regions on the hind side thereof, and also the number of operating regions that can be noticed by the user can be efficiently increased. Note that a third curved face may be set offset further on the hind side from the second curved face, with even more operating regions G300 that are planar in form placed thereupon. Thus, any number that is two or more, of the operating regions G300 that are planar in form, may be placed in an overlapping form as viewed from the viewpoint of the user.

Also, in the case of the plurality of operating regions G300 that are planar in form that overlap fore and aft in this way, a great number of the operating regions G300 can be placed so as to be operable by the user, and also the processing load relating to drawing can be efficiently reduced. For example, the overall processing load relating to drawing can be reduced by performing complete drawing of the thumbnail images or real-time video only for the operating regions G300-1, while performing imperfect drawing (e.g., processing with texture or the like changed) for the operating regions G300-2. Also, from a similar perspective, the overall processing load relating to drawing can be reduced by performing complete drawing of thumbnail images and real-time video only for the operating regions G300-1 in the region R500 at the front as viewed from the viewpoint of the user, out of the operating regions G300-1, while performing imperfect drawing (e.g., processing in which texture or the like is changed) for the operating regions G300-1 outside of the region R500 at the front. For example, precaching or preloading data regarding which the probability of becoming the operating region G300-1 within the region R500 at the front is high, at the terminal device 20 of the user, enables the number of requests submitted via the network 3, the amount of requests placed on the network 3 accordingly, and the calculation resources used for responding to the requests, to be efficiently reduced, while reducing latency. In this case, the data regarding which the probability of becoming the operating region G300-1 within the region R500 at the front is high may be predicted on the basis of tendencies of individual users, or may be decided by machine learning or the like, based on artificial intelligence.

FIG. 5B schematically illustrate the relation between the first curved face 501 and the second curved face 502 as viewed from above. An offset distance between the first curved face 501 and the second curved face 502 may be significantly smaller than the distance between layers of different attributes (e.g., the distance between the interface display layer J2 and the auxiliary information display layer J5). This facilitates comprehension by the user that both the first curved face 501 and the second curved face 502 are in the same interface display layer J2. Further, the user can more intuitively comprehend that there are a plurality of operating regions G300 that are planar in form present on the far side as well.

In a case of the interface display layer J2 in which there are placed such a plurality of operating regions G300 that are planar in form, the user may be able to change the placement of user interfaces (e.g., the plurality of operating regions G300 that are planar in form) by performing particular operations. This enables placement of user interfaces (e.g., the plurality of operating regions G300 that are planar in form) in accordance with likes and preferences of the user.

Part of the plurality of operating regions G300 that are planar in form may function as buttons to change the placement of the plurality of operating regions G300 that are planar in form, for example. Alternatively, the user may relocate the plurality of operating regions G300 that are planar in form to the left and to the right as viewed from the viewpoint of the user, by performing gesture input of moving the hand to the left and to the right. FIG. 6 illustrates a state partway through operating regions G300 on the left side (written as "G300L" in FIG. 6) relocating toward the front as viewed from the viewpoint of the user, by user operations. In this way, the plurality of operating regions G300 that are planar in form may be relocated to the left and to the right following the first curved face 501. Accordingly, out of the plurality of operating regions G300 that are planar in form, the operating regions G300 situated at the front as viewed from the viewpoint of the user can be easily changed. In this case, the plurality of operating regions G300 that are planar in form may be relocated in a form in which the operating regions G300 that are planar in form, situated at the region at the front, change in increments of category. Thus, the collections by category can be maintained, and accordingly both visual comprehension and operability can be realized.

Alternatively, part or all of the plurality of operating regions G300 that are planar in form may be continuously relocated to the left or to the right following the first curved face 501 (and/or the second curved face 502), regularly or irregularly, or may be moved so as to revolve. Such movement may be changeable as appropriate on the basis of settings made by the user, or may be realized on the basis of an event of predetermined relocation conditions being met.

Also, in a case in which the plurality of operating regions G300 that are planar in form overlapping fore and aft, as described above, the user may be able to switch the fore and aft by performing a predetermined input. For example, in a case in which the plurality of operating regions G300-2 of the second group placed following the second curved face 502 are overlapping behind the plurality of operating regions G300-1 of the first group placed following the first curved face 501 as viewed from the viewpoint of the user, as described above, the user may be able to switch the first group and the second group by performing a predetermined input by moving his/her hands in a predetermined form, as schematically illustrated in FIG. 7A. This enables intuitive operation, and operability improves. In this case, the plurality of operating regions G300-2 of the second group that were placed following the second curved face 502 are placed following the first curved face 501 as the first group, and the plurality of operating regions G300-1 of the first group that were placed following the first curved face 501 are placed following the second curved face 502 as the second group. Note that such a fore-and-aft switching operation may be applied just to the operating regions G300 that are situated at the front as viewed from the viewpoint of the user, out of the plurality of operating regions G300 that are planar in form. This enables the processing load to be reduced as compared with a case of switching the entirety of the plurality of operating regions G300 that are planar in form.

Note that the form of fore-and-aft switching may be a form in which the entirety of the plurality of operating regions G300-1 of the first group placed following the first curved face 501 are relocated hindward as a whole, as schematically illustrated by arrows in FIG. 7A, or may be a form in which out of the plurality of operating regions G300-1 of the first group placed following the first curved face 501, those on the upper side are relocated hindward from above, and those on the lower side are relocated hindward from below, as schematically illustrated by arrows in FIG. 7B. Also, in line with this, switching of the first group and the second group can be realized by a form in which, out of the plurality of operating regions G300-2 of the second group placed following the second curved face 502, those on the upper side are relocated forward from above, and those on the lower side are relocated forward from below, as schematically illustrated by the arrows in FIG. 7B. Note that while description has been made here regarding two groups, the same holds true for a case of three or more groups (i.e., a plurality of operating regions G300 that are planar in form, overlapping fore and aft in three layers or more).

Note that in the present embodiment, the home image H1 does not include the user avatar display layer J1, but this is not restrictive. The home image H1 may include the user avatar display layer J1 on the near side (the side nearer to the viewpoint of the user) from the interface display layer J2, for example. In this case, hands may be drawn on the user avatar display layer J1 of the home image H1 when the user extends his/her hands forward, or the like. Thus, the user can operate the plurality of operating regions G300 that are planar in form while watching the movement of the hands, and accordingly operability improves.

Figure 8A:
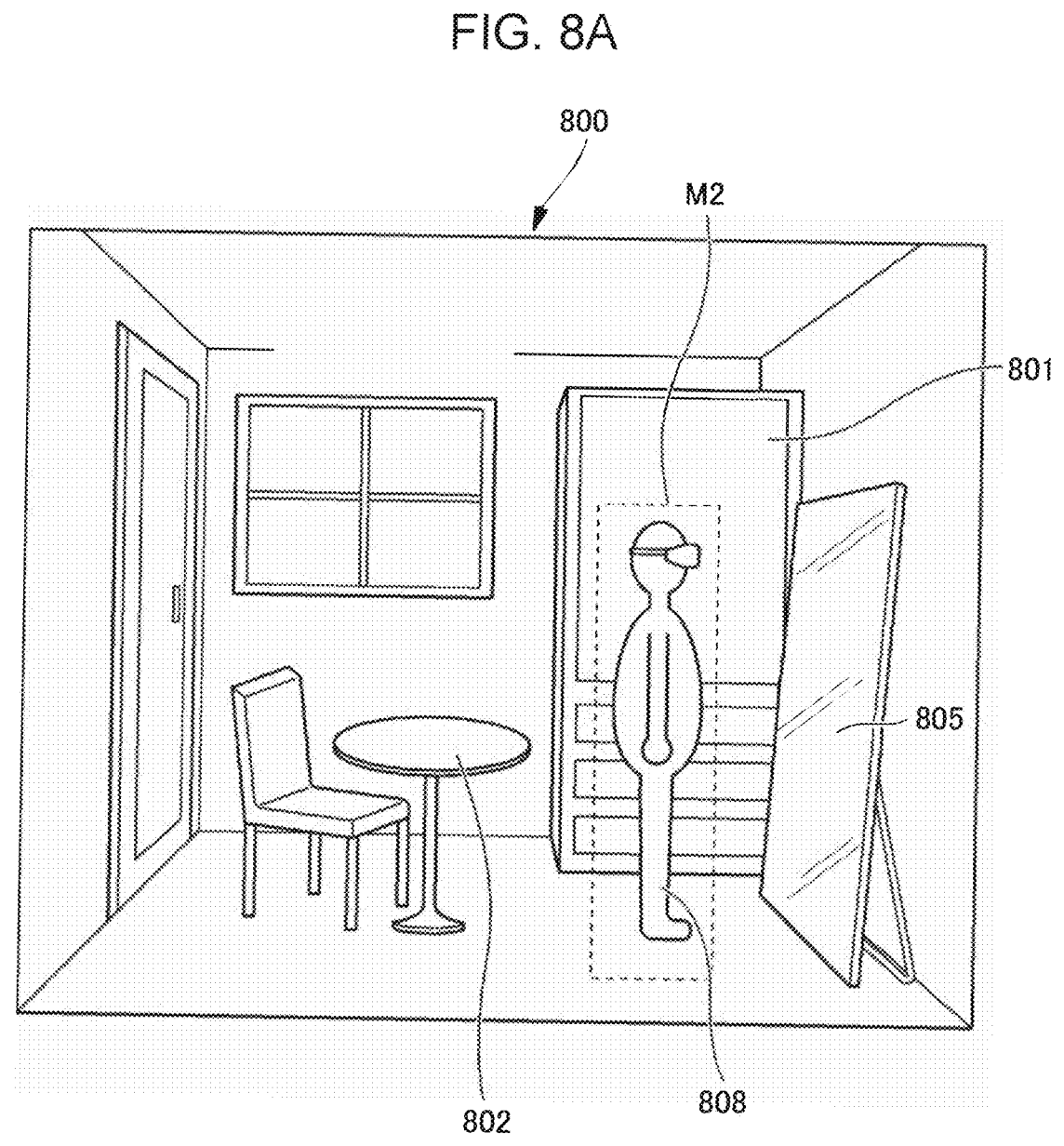
Figure 8B:
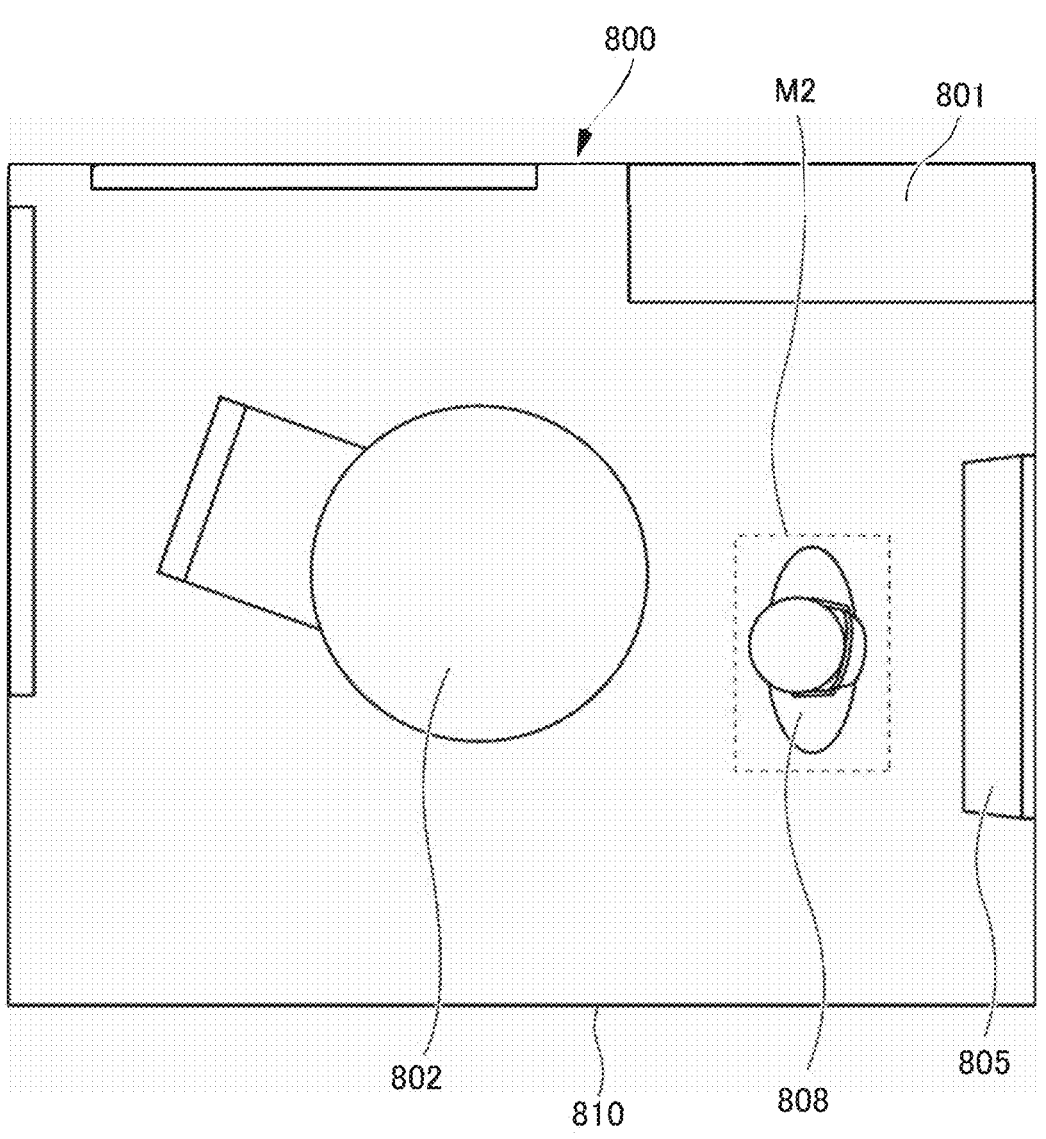
FIG. 8B is a schematic plan view of virtual space corresponding to the distribution image as viewed from above.
Figure 9:
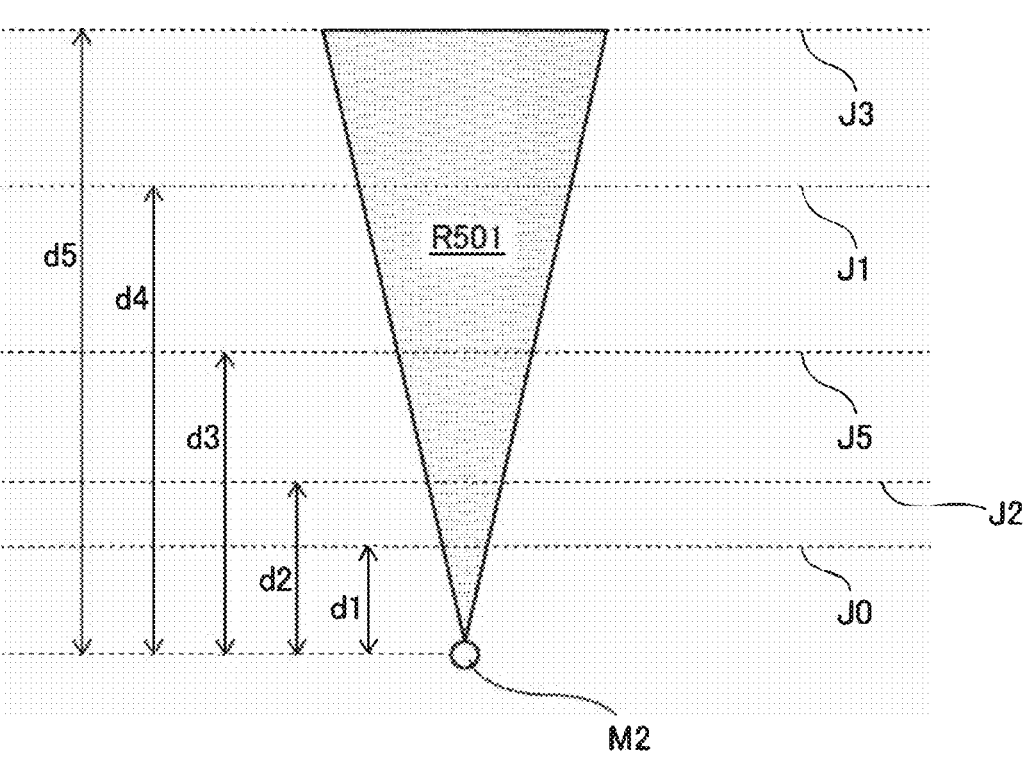
FIG. 9 is an explanatory diagram of a structure of a distribution image.
Figure 10:
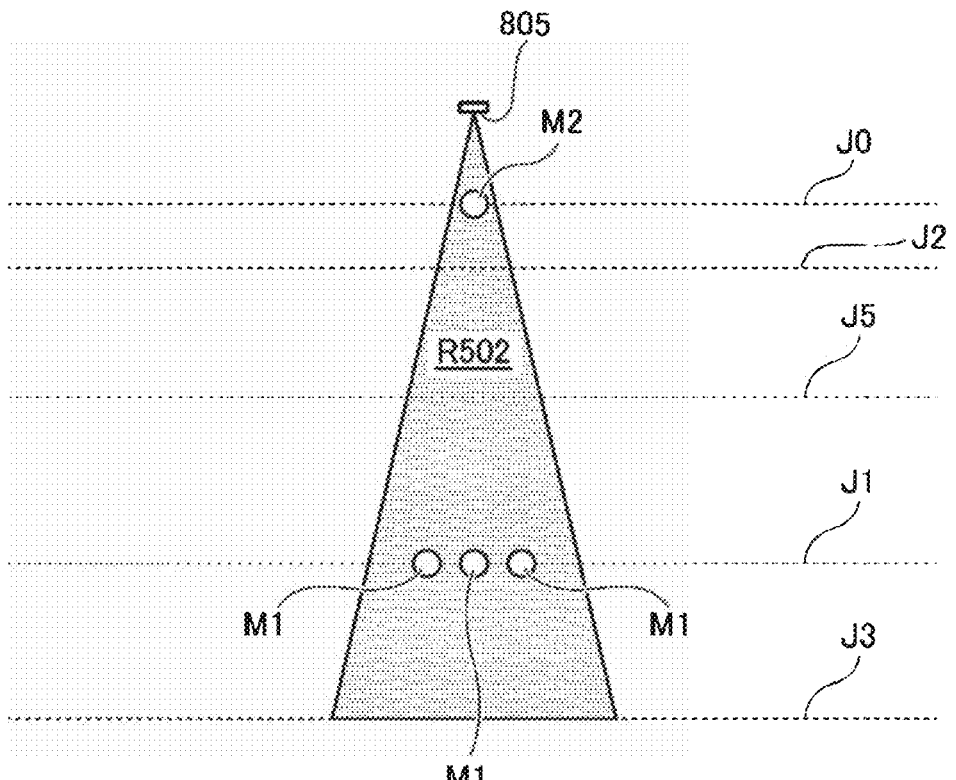
FIG. 10 is an explanatory diagram illustrating relations between a mirror and each layer in the distribution image as viewed from above.
Figure 11:
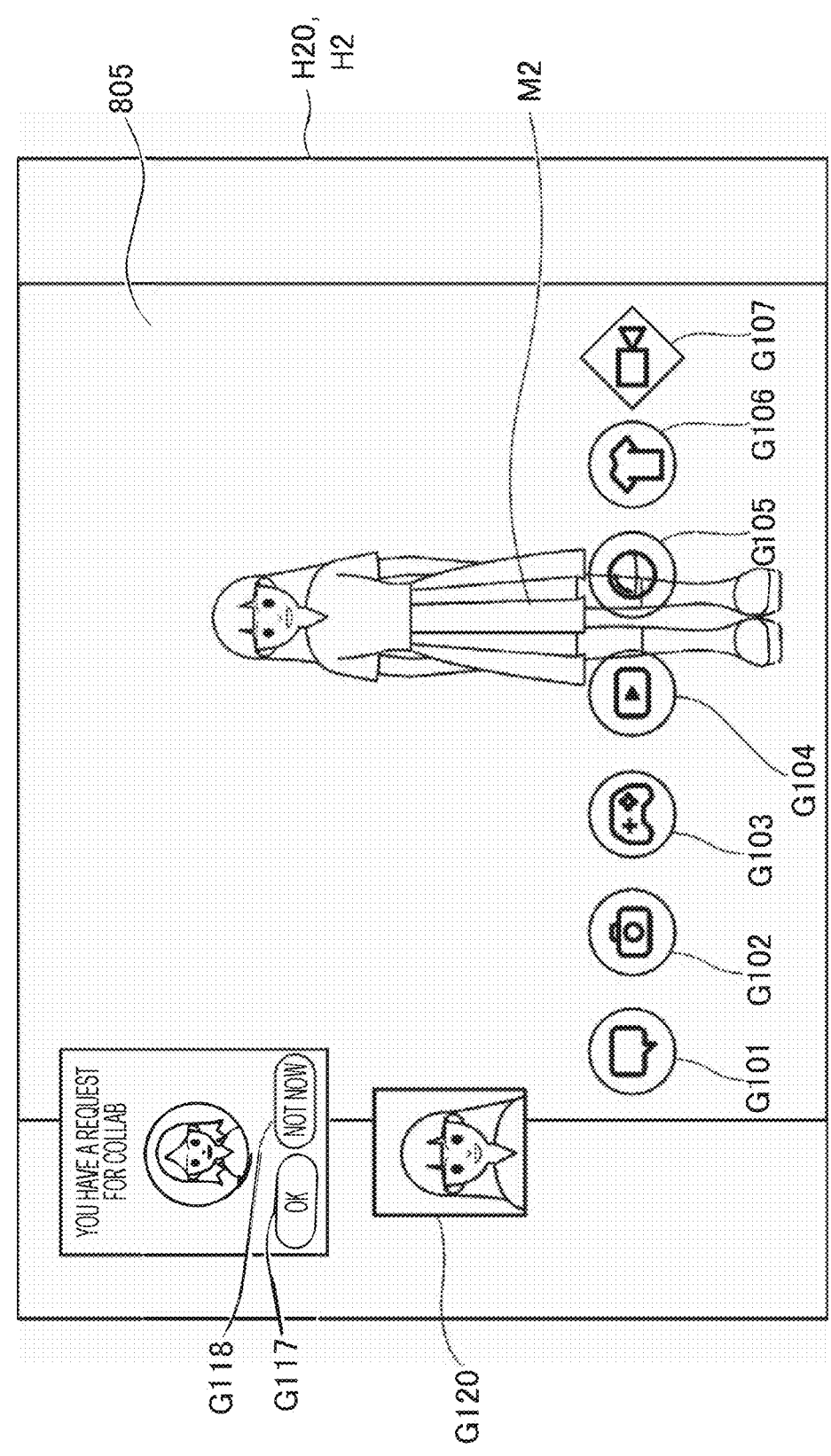
FIG. 11 is an explanatory diagram of an interface display layer relating to the distribution image.
Figure 12:
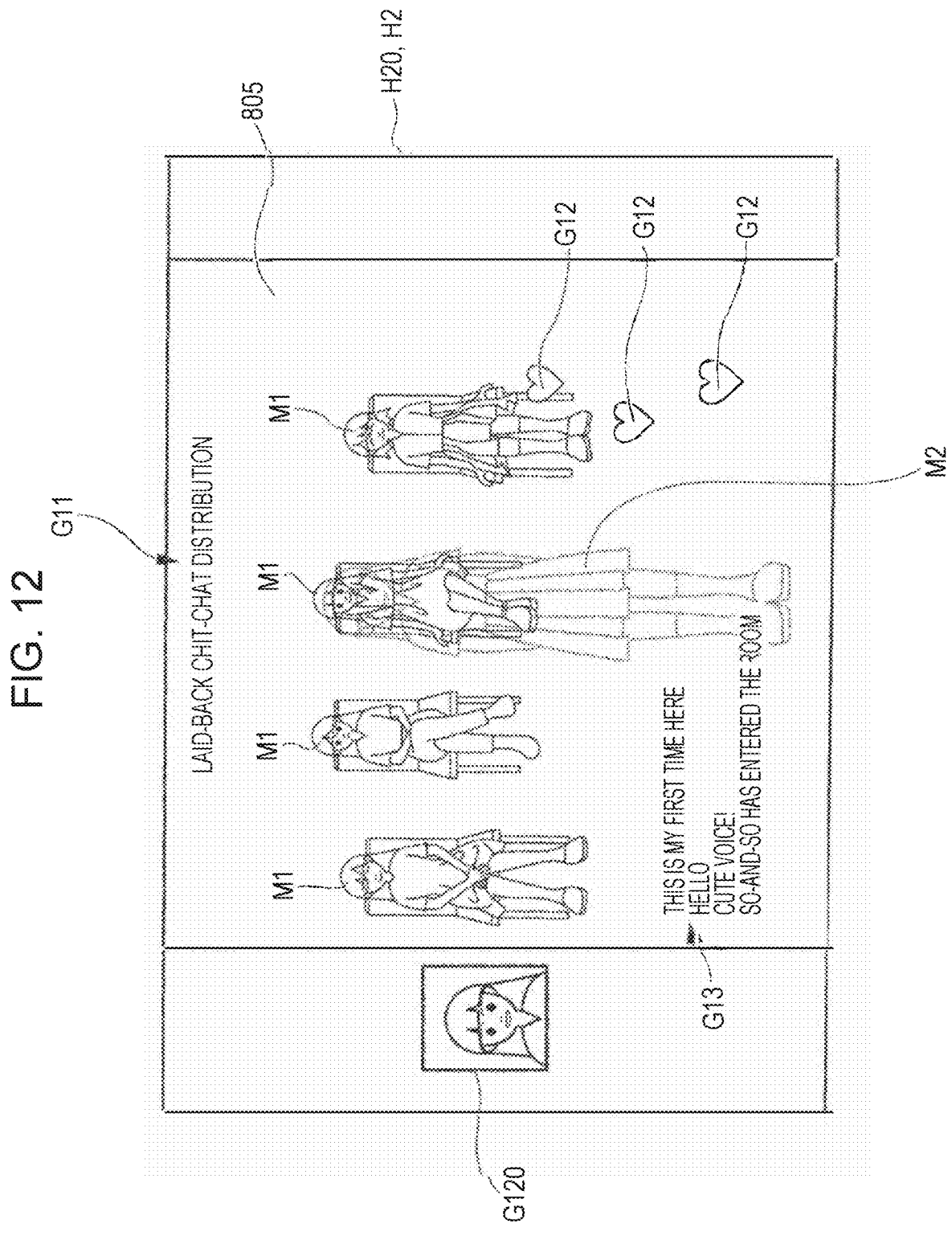
FIG. 12 is a diagram illustrating an example of the distribution image as viewed by a distributing user via a worn device.
Figure 13:
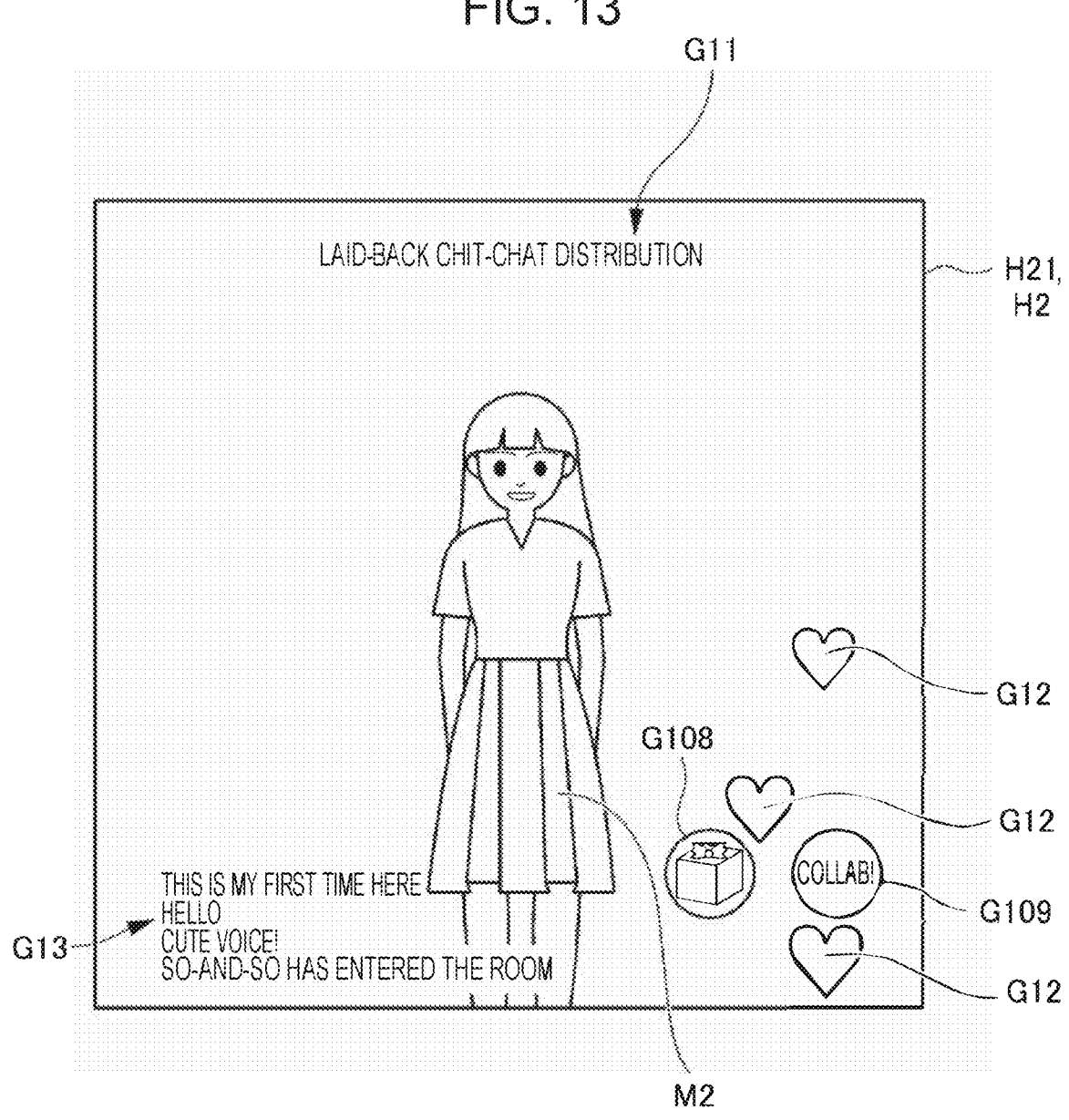
FIG. 13 is a diagram illustrating an example of the distribution image as viewed by a watching user via a worn device.
Figure 14:
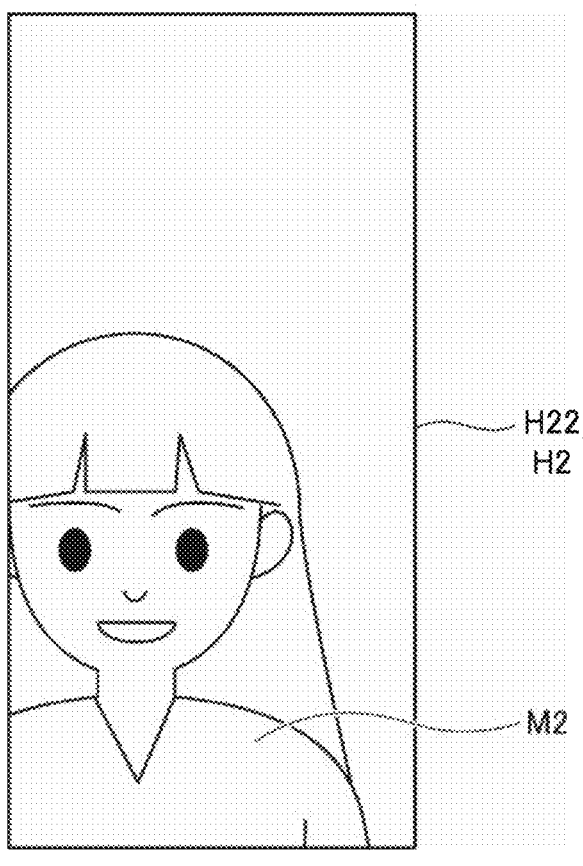
FIG. 14 is a diagram illustrating an example of a distribution image for a smartphone.

FIGS. 8A and 8B are explanatory diagrams of virtual space corresponding to a distribution image, in which FIG. 8A is a schematic side view, and FIG. 8B is a schematic plan view as viewed from above. In FIGS. 8A and 8B, a distributing user is schematically denoted by symbol 808, and the position of the distributor avatar M2 corresponding thereto is schematically illustrated by a doted-line enclosure. FIG. 9 is an explanatory diagram of a structure of an image of particular contents by the distributing user (hereafter referred to as "distribution image H2"). FIG. 10 is an explanatory diagram illustrating relations between a mirror and each layer in the distribution image H2 as viewed from above. FIG. 11 is an explanatory diagram of the interface display layer J2 relating to a distribution image H20 for the distributing user. FIG. 12 is a diagram illustrating an example of the distribution image H2 as viewed by the distributing user via a head-mounted display (example of a first worn device). FIG. 13 is a diagram illustrating an example of the distribution image H2 as viewed by a watching user via a head-mounted display (example of a second worn device). FIG. 14 is a diagram illustrating an example of the distribution image H2 for a smartphone. Note that the distribution image H2 illustrated in FIG. 14 is an image in a case of viewing without going through a head-mounted display, and can be used for similar terminals other than smartphones.

The distribution image H2 corresponds to an image relating to the virtual space that the distributor avatar M2 is placed in, which is virtual space for production of particular contents by the distributing user (hereinafter referred to as "contents production space") or other like virtual space. Note that the contents production space may corresponding to space of a studio in the real world or the like, for example.

The distributing user can perform production activities of the particular contents in the contents production space.

In the present embodiment, the distribution image H2 includes the distribution image H20 for the distributing user (see FIG. 12), a distribution image H21 that is a distribution image for the watching users and that can be viewed via a head-mounted display (see FIG. 13), and a distribution image H22 that is a distribution image for the watching users and that can be viewed without going through a head-mounted display (hereinafter, also referred to as distribution image H22 for smartphone) (see FIG. 14). Hereinafter, "distribution image H2" refers to any of these distribution images, unless stated otherwise in particular.

In the present embodiment, the distribution image H2 includes, in order from the foreside, the distributing avatar display layer J0, the interface display layer J2 (example of a layer according to a first user interface), the auxiliary information display layer J5, the user avatar display layer J1, and the background layer J3, as an example. Note that in a modification, other layers such as described above may be included, and part of the layers (e.g., the auxiliary information display layer J5 and the background layer J3) may be omitted. Also, the interface display layer J2 and the auxiliary information display layer J5 may be integrated as appropriate.

FIG. 9 illustrates a placement example of the distributing avatar display layer J0, the interface display layer J2, the auxiliary information display layer J5, the user avatar display layer J1, and the background layer J3, along with the predetermined reference axis I that passes through the position of the distributing user (the position of the distributor avatar M2), as viewed from above.

As illustrated in FIG. 9, in the present embodiment, the distributing avatar display layer J0, the interface display layer J2, the auxiliary information display layer J5, the user avatar display layer J1, and the background layer J3 are placed in a form that forms vertical planes at different distances d1 to d5 following the direction of the line of sight of the user through which the reference axis I passes, as viewed from above. In this case, each of the distances d1 to d5 correspond to the distance between each layer and the user. Note that the distance d5 to the background layer J3 may be at infinity, or may be at a distance in accordance with the distance of a plane that is the farthest from the viewpoint of a virtual camera (far clip plane). In this case, the interface display layer J2 may be set at the plane that is nearest in distance to the far clip plane of the virtual camera (near clip plane). Note that in this case, the viewpoint of the distributing user and the virtual camera may be set at the same position as a face or head object of the distributor avatar M2, and may have an optical axis of the virtual camera in a direction that heads forward from the viewpoint of the distributor avatar M2. In this case, the arms and hands of the distributor avatar M2 may be the object of drawing (movement of the hands and arms when extending the hands forward and performing operations), while the face of the distributor avatar M2 and the head of the distributor avatar M2 are not objects of drawing from the viewpoint of the distributing user. Note that even in this case, the distributor avatar M2 can be the object of drawing as the distributing avatar display layer J0 from other users (e.g., watching users). Also, the distance d2 of the interface display layer J2 may be set to be within a range that is reachable by the hands of the user, as described above. Also, the distance d2 may be adjustable for each user. Also, the distance d2 may be the same as the above-described radius r1 (see FIG. 5). Thus, the interface display layer J2 can be formed with a sense of distance in accordance with the length of the arms and preferences of the user. Also, in a case in which the distance d2 is the same as the radius r1 (see FIG. 5), the same (common) operability can be realized between the distribution image H20 for the distributing user and the home image H1, whereby convenience can be improved.

Any arrangement of the contents production space that is the virtual space in which the distributor avatar M2 performs activities may be employed, and in the example illustrated in FIGS. 8A and 8B, for example, a distribution room 800 is included. A closet 801 for the distributor avatar M2 to change clothing, and a table 802, may be placed in the distribution room 800. The distributing user can select desired avatar items from avatar items in the closet 801 and perform preparations (standby) of the distributor avatar M2. Note that avatar items are items that are drawn in a manner associated with avatars such as the distributor avatar M2 and so forth, and may include, for example, hairstyles, clothing, attachments, color of skin, and so forth.

As a preferable example of the contents production space, a mirror 805 is placed within the distribution room 800 in the present embodiment. The mirror 805 has a nature of reflecting light (visible light), in the same way as with mirrors in the real world. The image in the mirror 805 corresponds to the distribution image H20. Accordingly, by situating the distributor avatar M2 corresponding to him/herself in front of the mirror 805, the distributing user can confirm various types of states of the distributor avatar M2 corresponding to the various types of states (orientation, position, and movement) of him/herself (and in conjunction, can confirm the state of the distribution image H20), while viewing the front (the mirror 805). Thus, the distributing user can confirm the various types of states (orientation, position, and movement) of him/herself in a state of facing the mirror 805 straight on (a state of facing the front) and with the line of sight directed toward the mirror 805, and correspondingly, states of the distributor avatar M2 (and in conjunction, the state of the distribution image H20). In this way, the distributing user can correct movements of him/herself as appropriate in real time, while confirming movements of him/herself, in a state of facing the mirror 805 straight on and accordingly can easily generate desired distribution images H20 just as he/she imagined.

FIG. 10 illustrates the positional relations among the mirror 805 within the distribution room 800, the distributing user, and the layers of the distribution image H2, as viewed from above. In FIG. 10, a region R502 is a region that corresponds to a region R501 illustrated in FIG. 9. The region R502 corresponding to a field of view across the mirror 805 when viewing the front from the viewpoint of the distributing user corresponds to the field of view of a virtual camera, when assuming that the virtual camera is placed at the mirror 805. In this case, the virtual camera inside the mirror 805 can serve the same function as the mirror 805 by displaying the image that is imaged thereby on the mirror 805.

The distributor avatar is drawn in the distributing avatar display layer J0. In this case, the distributor avatar M2 is drawn in the distributing avatar display layer J0 in states in accordance with various types of states (orientation, position, and movement) of the distributing user standing in front of the mirror 805. Note that the various types of states (orientation, position, and movement) of the distributing user can be acquired via the input unit 24, as described above.

The interface display layer J2 is preferably placed with the position of the distributing user standing in front of the mirror 805 as a reference. In other words, when the distributing user stands in front of the mirror 805, the distributing user is positioned at a particular positional relation as to the interface display layer J2. In the present embodiment, the interface display layer J2 is placed within a range reachable by the hands of the user at that position, with the position of the distributing user standing in front of the mirror 805 as a reference. Note that the particular positional relation may be changeable by the user as appropriate. Accordingly, the interface display layer J2 can be realized in accordance with preferences and build of the user.

The interface display layer J2 preferably includes one or more operating regions that function as the input unit 24. Various types of operating regions can function as selection buttons that are selectable by the distributing user. For example, the distributing user may be able to select (operate) a desired selection button via non-contact user input.

In this case, any of various types of processing (example of various types of first processing) realized by operating the operating regions may be employed, and may include at least one of, for example, processing to start distributing particular contents, processing to end distributing particular contents, speech input processing, processing for the distributing user to receive gifts, processing of holding drawings for items (e.g., items relating to avatars), processing for selecting/exchanging various types of items, processing for text input, processing for accepting other users, processing for changing values of parameters of distributed contents (e.g., various types of parameters in the distribution image H2, which will be described later), and processing for transitioning to a state in which the above processing can be executed.

FIG. 11 illustrates an example of operating regions G100 in the forms of various types of icons in the distribution image H20 for the distributing user. In the example illustrated in FIG. 11, the various types of operating regions G100 include an operating region G101 for performing chat (commenting), an operating region G102 for acquiring a screen shot, an operating region G103 for gaming, an operating region G104 for sharing other moving image contents (including sharing, in a form in which a watching user and a distributing user watch the same moving image, and so forth), an operating region G105 for loot boxes (drawings), and so forth. Note that any object may be the object of the drawings by loot boxes, and may be avatar items, for example.

The operating regions in the interface display layer J2 may be displayed at all times, or may be displayed only in particular cases. Thus, the display region of the distributor avatar M2 can be enlarged and the entire distributor avatar M2 can be displayed, while enabling operations via the operating regions in the interface display layer J2.

Also, particular operating regions in the interface display layer J2 may be displayed in a from the same as that of the operating regions G300 relating to the home image H1 such as described above. In this case as well, the various types of operating regions in the interface display layer J2 may be switchable between fore and aft, in accordance with the form described above with reference to FIGS. 7A and 7B.

Also, in a preferable embodiment, the operating regions in the interface display layer J2 includes an operating region G120 for adjusting various types of parameters of the distribution image H2 (hereinafter also referred to as "smartphone small-window region G120"). The smartphone small-window region G120 may display part or all of the distribution image H21 for watching users and/or part or all of the distribution image H22 for smartphones.

The various types of parameters of the distribution image H2 that are adjustable via the smartphone small-window region G120 are parameters relating to the virtual camera, for example, and specifically may include brightness, distance from the virtual camera (i.e., distance between the mirror 805 and the distributing user), direction of optical axis of the virtual camera, position in lateral direction of the virtual camera (position with respect to the distributing user in a lateral direction intersecting the optical axis direction), zoom (magnification), and so forth. In this case, for example, the distributing user may operate the smartphone small-window region G120 in a form as if it were a smartphone, to change the zoom scale of the image within the smartphone small-window region G120 by pinching out or pinching in, for example, or may be able to perform translation of the image within the smartphone small-window region G120 by swiping. Also, the distributing user may be able to change the position of the virtual camera (the relative positions thereof as to him/herself) by performing an operation to relocate the position of the smartphone small-window region G120. Also, the distributing user may be able to switch between a tracking mode in which the position of the virtual camera automatically tracks the distributing user relocating, and a fixed mode in which the position of the virtual camera is fixed, by controlling the state of the virtual camera via the smartphone small-window region G120. In this case, relocation-type distribution can be performed by the tracking mode. Also, the distributing user may be able to form a state in which watching users are not presented with things that the distributing user does not want them to see, such as in an away-from-keyboard (AFK) state or muted state, by controlling the state of the virtual camera via the smartphone small-window region G120. Accordingly, convenience of the distributing user can be raised while preventing increase in the processing load due to drawing unnecessary objects.

Now, in a state of wearing a head-mounted display or the like, operability of the user adjusting various types of parameters of the distribution image H2 tends to be poor, unlike with operations in actual space. However, providing the smartphone small-window region G120 improves operability.

Also, in a case in which the distribution image H22 for smartphones is displayed in the smartphone small-window region G120, the distributing user can produce particular contents while confirming the distribution image H22 for a case of watching by smartphone, along with the distribution image H20 that generally matches the distribution image H21 for a case of watching via a head-mounted display. Also, instead of or in addition to the smartphone small-window region G120, a small-window portion for other watching devices, such as a tablet small-window portion, may be set. The distributing user can select a desired small-window portion and perform display thereof in the distribution image H20.

In the example illustrated in FIG. 12, the smartphone small-window region G120 is displayed adjacent to the mirror 805 in which the distributor avatar M2 is reflected. The smartphone small-window region G120 may display the distribution image H22 (see FIG. 14) for a case of display on smartphones. In this case, the distributing user can perform distribution while confirming, in real-time, the state of the distribution image H22 on terminal devices 20 of watching users watching by smartphones.

Note that in a modification, the distribution image H20 may include two concepts of an image being distributed and a preparation image before distribution. In a case of a preparation image before distribution, an operating region G106 (see FIG. 11) for opening the closet 801 (see FIG. 8A) and changing clothing, an operating region G107 (see FIG. 11) for starting distribution, and so forth, may be drawn in the interface display layer J2.

Gift items from watching users of the particular contents relating to the distribution image H2, and text information of supportive messages and so forth, may be drawn in the auxiliary information display layer J5 in real-time. Accordingly, the distributing user can perform distribution of particular contents while enjoying reactions of watching users, interchange with the watching users, and so forth. Also, a distribution name, title, or the like, of the particular contents, may be drawn in the auxiliary information display layer J5. For example, in the example illustrated in FIG. 12, a distribution name G11 of "laid-back chit-chat distribution", gift objects G12 that are heart-shaped, various types of comments G13 such as "This is my first time here . . . ", and so forth, are drawn.

The watcher avatars M1 of watching users of the particular contents relating to the distribution image H2 may be drawn in the user avatar display layer J1. Accordingly, the distributing user can perform distribution while comprehending the number and state of watching users. Note that the watcher avatars M1 drawn in the user avatar display layer J1 may be drawn in states in accordance with the states (orientation, position, and movement) of the corresponding watching users. Accordingly, the distributing user can perform distribution while comprehending the state of the watching users.

In this case, the distributor avatar M2 drawn in the distributing avatar display layer J0 may be drawn so as to be semitransparent, so that the distributing user can easily comprehend the state in the user avatar display layer J1. Thus, in this case, the distributing user can easily confirm the state of the user avatar display layer J1 behind the distributor avatar M2. Note that the distributing user may be enabled to perform input to switch the distributor avatar M2 between the semitransparent state and a solid state. This facilitates the distributing user selectively confirming the state of the distributor avatar M2 and the state of the user avatar display layer J1 behind the distributor avatar M2 in this case.

Walls or the like of the distribution room 800 may be drawn in the background layer J3. Alternatively, scenery on the other side of the walls of the distribution room 800 may be drawn in the background layer J3. Note that the watcher avatars M1 of the watching users of the particular contents relating to the distribution image H2 may enter a virtual space that is different from the contents production space (hereinafter, "watching space"). In this case, a background relating to the watching space may be drawn in the background layer J3. In such a case, the distribution image H21 for watching users (see FIG. 13), which is an image of the watching space, may have a background layer J3 that is different from the distribution image H20 for the distributing user (see FIG. 12). Thus, there may be inconsistency between the watching space and the virtual space (contents production space) represented by the distribution image H20 for the distributing user. Accordingly, the distribution image H21 for watching users can be optimized from a different perspective as the distribution image H20 for the distributing user.

Note that in a modification, the distribution room 800 may have a wall member 810 that is a one-way mirror on a front face side thereof, as schematically illustrated in FIG. 8B. In this case, the wall member 810 allows inside of the room to be seen from the outside, while functioning to reflect in the same way as the mirror 805 so that outside of the room cannot be seen from inside. In this case, the distributing user can perform distribution, using the wall member 810 in the same form as the mirror 805 described above. On the other hand, the watching users can watch the distributing user (distributor avatar M2) in the distribution room 800, through the wall member 810. Note that in this case, the background layer J3 of the distribution image H2 may include a drawing of a special stage or the like, instead of the inside of the distribution room 800.

Next, configuration examples of the virtual reality generating system 1 described above will be described in order, with reference to FIG. 15 and subsequent drawings.

Figures 15, 16:
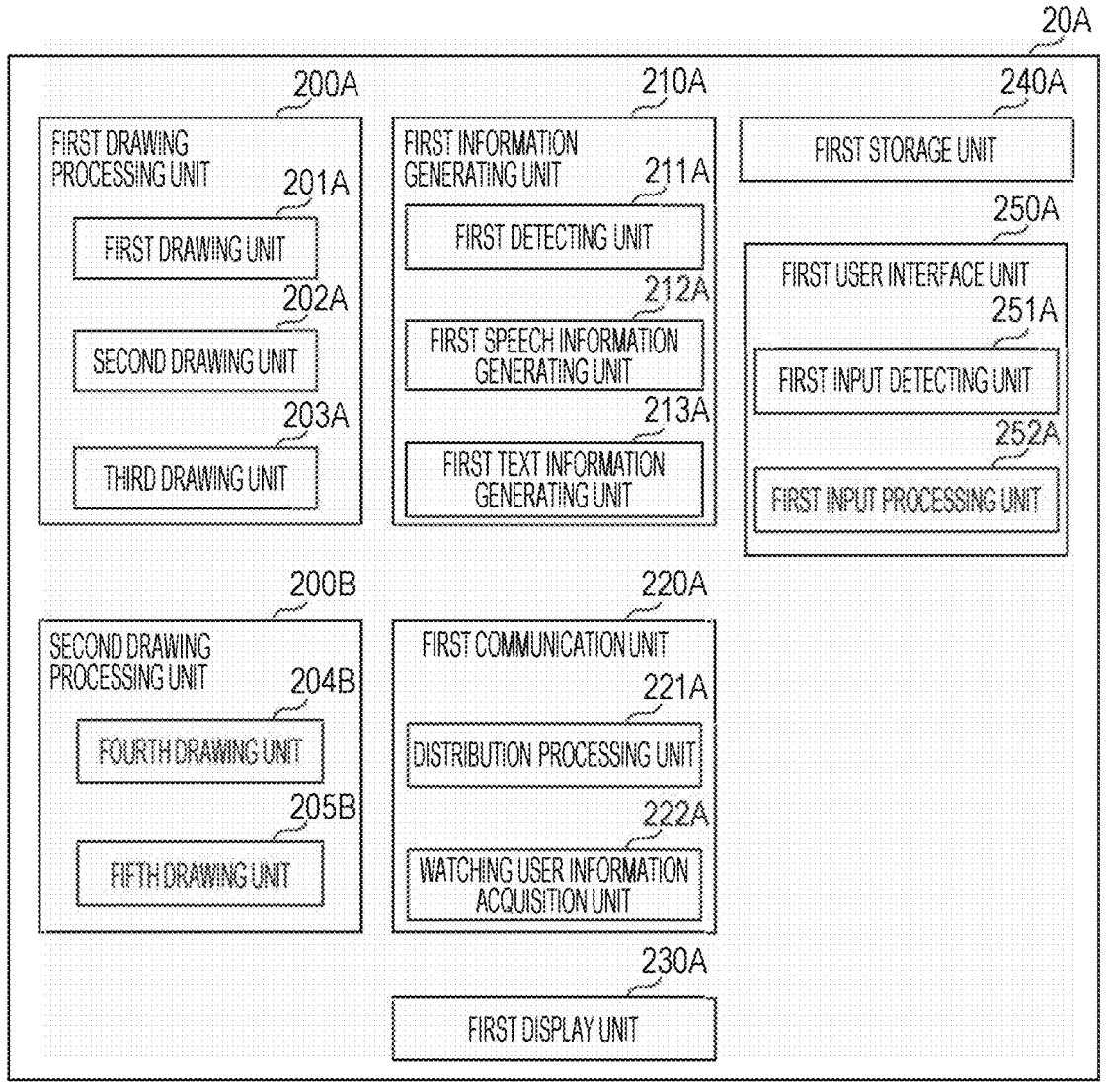
FIG. 15 is a schematic block diagram illustrating functions of a terminal device on a contents-distributing side.
FIG. 16 is an explanatory diagram of an example of drawing information for an avatar.

FIG. 15 is a schematic block diagram illustrating functions of the terminal device 20A on the contents-distributing side. FIG. 16 is an explanatory diagram of an example of drawing information for an avatar. In the description of FIGS. 15 and 16, "distributing user" refers to one distributing user, and "distribution image H2 (H20)" refers to the distribution image H2 forming the particular contents by this one distributing user, unless stated otherwise in particular.

As illustrated in FIG. 15, the terminal device 20A includes a first drawing processing unit 200A, a second drawing processing unit 200B, a first information generating unit 210A, a first communication unit 220A, a first display unit 230A, a first storage unit 240A, and a first user interface unit 250A.

The functions of each of the first drawing processing unit 200A, the second drawing processing unit 200B, the first information generating unit 210A, the first communication unit 220A, the first display unit 230A, and the first user interface unit 250A can be realized by the terminal control unit 25 of the terminal device 20A executing a virtual reality application in collaboration with the terminal communication unit 21, the terminal storage unit 22, the display unit 23, and the input unit 24 illustrated in FIG. 1. Also, the first storage unit 240A can be realized by the terminal storage unit 22 of the terminal device 20A illustrated in FIG. 1.

The first drawing processing unit 200A draws the distribution image H20 for the distributing user (see FIG. 12) (example of an image of first virtual space), which is described above. The first drawing processing unit 200A generates the distribution image H20 for the distributing user (see FIG. 12) at a predetermined framerate, for example.

The first drawing processing unit 200A includes a first drawing unit 201A, a second drawing unit 202A, and a third drawing unit 203A.

The first drawing unit 201A draws the image region of the distributing avatar display layer J0 (example of a first image region) in the distribution image H20 for the distributing user (see FIG. 12). The distributing avatar display layer J0 in the distribution image H20 is as described above. The first drawing unit 201A may draw the distributor avatar M2 in the image region of the distributing avatar display layer J0 on the basis of drawing information for avatars (see Table 700 in FIG. 16) stored in the first storage unit 240A, for example. FIG. 16 schematically shows an example of drawing information for avatars as the Table 700.

In this case, in drawing information of avatars, a face part ID, a hairstyle part ID, a clothing part ID, and so forth, are associated with each avatar ID. The face part ID, hairstyle part ID, clothing part ID, and so forth, which are part information relating to appearance, are parameters that characterize the avatar, and may be selected by each user. For example, a plurality of types of information relating to appearance of the avatar, such as the face part ID, hairstyle part ID, clothing part ID, and so forth, are prepared. Also, for the face part ID, part IDs are respectively prepared for each type such as the facial outline, eyes, mouth, nose, and so forth. Information relating to the face part ID may be managed in combination with the IDs of the parts making up this face. In this case, the avatars can be drawn not only at the server device 10 but also at the terminal device 20 side, on the basis of the IDs relating to appearance that are associated with each avatar ID.

Note that in a case in which the distributor avatar M2 opens the closet 801 (see FIG. 8A) and changes clothing or the like, for example (i.e., in a case of changing IDs relating to hairstyle and clothing), the first drawing unit 201A updates the appearance of the distributor avatar M2 accordingly.

Also, the first drawing unit 201A changes the state of the distributor avatar M2 on the basis of detection results (detection results of the state of the distributing user) from a first detecting unit 211A (described later) of the first information generating unit 210A. In the present embodiment, the first drawing unit 201A draws the distributor avatar M2 in a form of replacing the state of the distributing user facing the mirror 805 (see FIG. 8A) with the distributor avatar M2, as described above.

For example, in a case in which the distributor avatar M2 is a form of a character that has a frontal direction, the first drawing unit 201A may cause the orientation of the distributor avatar M2 to be synchronized with the orientation of the distributing user, in a form such as when the distributing user faces to the right, the distributor avatar M2 faces to the left, and when the distributing user faces downward, the distributor avatar M2 faces downward. Note that in this case, the orientation may be just that of the face, or just that of the body, or a combination thereof. This increases the consistency (synchronization) of orientation between the distributor avatar M2 and the distributing user, thereby enabling diversification of expressions through orientation of the distributor avatar M2.

Also, in a case in which the distributor avatar M2 is a form of a character that has a line of sight direction, the first drawing unit 201A may cause the orientation of the line of sight of the distributor avatar M2 to be synchronized with the orientation of the line of sight of the distributing user, in a form such as when the line of sight of the distributing user faces to the right, the line of sight of the distributor avatar M2 faces to the left, and when the line of sight of the distributing user faces downward, the line of sight of the distributor avatar M2 faces downward. Various types of movement of the eyes, such as blinking and so forth, may also be synchronized. Also, movements of the nose, mouth, and so forth, may be synchronized. This increases the consistency (synchronization) of each part between the distributor avatar M2 and the distributing user, thereby enabling diversification of expressions of the distributor avatar M2.

Also, in a case in which the distributor avatar M2 is a form of a character that has hands, the first drawing unit 201A may cause the movement of the hands of the distributor avatar M2 to be synchronized with the movement of the hands of the distributing user, in a form such as when the distributing user raises the right hand, the distributor avatar M2 raises the left hand, and when the distributing user raises both hands, the distributor avatar M2 raises both hands. Movement of each part of the hands, such as the fingers and so forth, may also be synchronized. Other parts, such as feet and so forth, may also be synchronized in the same way. This increases the consistency (synchronization) between the distributor avatar M2 and the distributing user, thereby enabling diversification of expressions through movement and so forth of parts of the distributor avatar M2.

Also, in a case in which the position of the distributor avatar M2 in the distribution image H20 is variable (i.e., in a case in which the distributor avatar M2 is a character that changes positions), the first drawing unit 201A may change the position of the distributor avatar M2 in the distribution image H20 in accordance with the position of the distributing user (position with respect to the mirror 805), in a form such as when the distributing user is relocated to the right, the distributor avatar M2 is relocated to the left, and when the distributing user moves away from the mirror 805, the distributor avatar M2 recedes. This increases the consistency (synchronization) relating to relocation (position) between the distributor avatar M2 and the distributing user, thereby enabling diversification of expressions through change in position of the distributor avatar M2.

The second drawing unit 202A draws the image region of the interface display layer J2 (example of a second image region) in the distribution image H20 for the distributing user (see FIG. 12). The interface display layer J2 in the distribution image H20 is as described above.

The second drawing unit 202A draws the various types of operating regions G100 (see FIG. 11) and the smartphone small-window region G120 (see FIG. 12) described above. In this case, the second drawing unit 202A may draw the various types of operating regions G100 and the smartphone small-window region G120 at all times, or omit drawing of part or all as appropriate. For example, the second drawing unit 202A may output operating regions G117 and G118 (see FIG. 11) for accepting/declining collaboration, in response to a collab accepting/declining instruction from a watching user information acquisition unit 222A, which will be described later. Thus, simplification (easy viewing) of the display of the interface display layer J2 can be realized, while increasing variation in operations that can be performed via the interface display layer J2.

The third drawing unit 203A draws the image regions of remaining layers (example of a third image region) in the distribution image H20 for the distributing user (see FIG. 12). That is to say, the third drawing unit 203A draws the image regions of layers other than the distributing avatar display layer J0 and the interface display layer J2 in the distribution image H20. For example, the third drawing unit 203A may draw the image regions of the background layer J3 or the auxiliary information display layer J5, in accordance with the structure of the distribution image H20, which may be hierarchical.

In the present embodiment, the distribution image H20 includes, in order from the foreside, the distributing avatar display layer J0, the interface display layer J2, the auxiliary information display layer J5, the user avatar display layer J1, and the background layer J3, as an example, as described above.

Accordingly, in the present embodiment, the third drawing unit 203A draws the image regions of each of the auxiliary information display layer J5, the user avatar display layer J1, and the background layer J3.

The third drawing unit 203A may draw gift objects in the image region of the auxiliary information display layer J5 on the basis of drawing information of gift objects stored in the first storage unit 240A for example, in response to a gift drawing instruction from the watching user information acquisition unit 222A, which will be described later. Note that drawing information relating to gift objects may be stored in the first storage unit 240A for each gift ID. The gift drawing instruction may include the gift ID identifying the gift object that is the object of drawing, and coordinates information. The coordinates information is information instructing the position of drawing in the distribution image H20, and may change in time sequence. Also, the coordinates information may include movement information representing movement of the gift object. Movement information may represent movement such as falling while rotating for example, or the like. Thus, diversification of expression of gift objects can be realized.

Also, the third drawing unit 203A may draw the watcher avatars M1 (watcher avatars M1 of the watching users) in the image region of the user avatar display layer J1 on the basis of drawing information for avatars (see Table 700 in FIG. 16) stored in the first storage unit 240A for example, in response to a watching user drawing instruction from the watching user information acquisition unit 222A, which will be described later. The watching user drawing instruction may include various types of information for drawing the watcher avatar M1 relating to the watching user watching the particular contents. For example, the various types of information for drawing the watcher avatar M1 may include information of the watcher avatar M1 (e.g., avatar ID, face part ID, hairstyle part ID, clothing part ID, etc.), and coordinates information. Also, in a case of a specification in which the watcher avatar M1 is imparted with movement, the watching user drawing instruction may include information representing the state of the watching user (or information representing the state of the watcher avatar M1 on the basis thereof). Accordingly, the movement of the watching user can be expressed in the distribution image H20 for the distributing user, and accordingly a sense of unity can be raised between the distributing user and the watching user.

Also, the third drawing unit 203A may draw various types of comments in the image region of the user avatar display layer J1, in response to a comment drawing instruction from the watching user information acquisition unit 222A, which will be described later. The comment drawing instruction may include a comment ID and coordinates information. Note that drawing information relating to fixed-phrase comments may be stored in the first storage unit 240A, sorted by comment IDs. Note that instead of the comment IDs relating to the fixed-phrase comments, text information that can be transmitted from a terminal device 20B on the contents-watching side (e.g., chat messages or the like) may be used. Thus, individual messages and so forth can be transmitted from each of the watching users, and accordingly a sense of unity can be raised between the distributing user and the watching user in the distribution image H20 for the distributing user.

Also, the third drawing unit 203A may draw a background image, corresponding to a background ID selected by the distributing user, in the background layer J3. The background images may be stored in the first storage unit 240A, sorted by background IDs. Note that background images may also be customized by the distributing user.

The second drawing processing unit 200B draws the home image H1 (see FIG. 6) described above (example of image of second virtual space). The second drawing processing unit 200B generates the home image H1 (see FIG. 6) at a predetermined frame rate, for example.

The second drawing processing unit 200B includes a fourth drawing unit 204B and a fifth drawing unit 205B.

The fourth drawing unit 204B draws the image region of the interface display layer J2 (example of a fourth image region) in the home image H1 (see FIG. 6). The interface display layer J2 in the home image H1 is as described above.

The fourth drawing unit 204B may change placement and so forth of the plurality of operating regions G300 (see FIGS. 6 and 7A) in response to a command from a first input processing unit 252A, which will be described later.

The fifth drawing unit 205B draws the image regions of the remaining layers (example of a fifth image region) in the home image H1 (see FIG. 6). That is to say, the fifth drawing unit 205B draws the image regions of layers other than the interface display layer J2 in the home image H1. For example, the fifth drawing unit 205B may draw the image regions of the background layer J3 or the auxiliary information display layer J5, in accordance with the structure of the home image H1 which may be hierarchical. Accordingly, various types of information that can be necessary to users can be efficiently provided without increasing the processing load relating to drawing.

In the present embodiment, the home image H1 includes, in order from the foreside, the interface display layer J2, the auxiliary information display layer J5, and the background layer J3, as an example, as described above.

Accordingly, in the present embodiment, the fifth drawing unit 205B draws the image regions of each of the auxiliary information display layer J5 and the background layer J3.

The first information generating unit 210A generates various types of information relating to the distributing user (hereinafter referred to as "distributing user information"). The distributing user information includes information representing the state of the distributing user (the state of the distributing user that is detected by the first detecting unit 211A), which is used by the first user interface unit 250A, which will be described later. Also, the distributing user information includes information necessary for drawing the distribution image H21 for watching users (see FIG. 13). For example, the distributing user information includes information for drawing the distributor avatar M2 (e.g., avatar ID, face part ID, hairstyle part ID, clothing part ID, etc.). Also, in a case in which the particular contents by the distributing user include speech by the distributing user, the distributing user information may include speech information acquired via a microphone or the like of the input unit 24. Thus, various types of information making up the particular contents can be handled in a separated state, thereby enabling distributed processing.

In the present embodiment, the first information generating unit 210A includes the first detecting unit 211A, a first speech information generating unit 212A, and a first text information generating unit 213A.

The first detecting unit 211A detects the state of the distributing user (the orientation and position, movement, or the like, of the user). The first detecting unit 211A may detect the state of the distributing user via the input unit 24 described above. In a state in which the home image H1 is drawn, the first detecting unit 211A may detect the state of the distributing user at a cycle in accordance with the frame rate of the home image H1, for example. Also, in a state in which the distribution image H20 for the distributing user is drawn, the first detecting unit 211A may detect the state of the distributing user at a cycle in accordance with the frame rate of the distribution image H20 for the distributing user (see FIG. 12), for example. Accordingly, the state of the distributing user (and correspondingly the display of the distributor avatar M2) can be detected (updated) at a high frequency.

The on/off state of the first detecting unit 211A may be switched in accordance with operations by the distributing user, for example. For example, an arrangement may be made where, in a case in which the distributing user operates a button for starting distribution (see operating region G107 in FIG. 11), which can be displayed in the interface display layer J2, this operation is detected by a first input detecting unit 251A, which will be described later, and the first detecting unit 211A transitions to the on state in response to a command from the first input processing unit 252A, which will be described later. Thus, simplification (easy viewing) of the display of the interface display layer J2 can be realized, while increasing variation in operations that can be performed via the interface display layer J2. Realizing simplification of the display of the interface display layer J2 improves the ease of viewing of the layers behind.

The first speech information generating unit 212A generates speech information based on utterance of the distributing user. For example, the first speech information generating unit 212A generates speech information of the distributing user via a microphone or the like of the input unit 24. Note that the first speech information generating unit 212A may process the speech data acquired via the input unit 24 to generate speech information of the distributing user. In this case, the processing method may be selectable by the distributing user, or processing of the speech data may be realized manually by the distributing user.

The on/off state of the first speech information generating unit 212A may be switched in accordance with operations by the distributing user, for example. For example, an arrangement may be made where, in a case in which the distributing user operates a mute button (omitted from illustration), which can be displayed in the interface display layer J2, this operation is detected by the first input detecting unit 251A, which will be described later, and the first speech information generating unit 212A transitions to the off state in response to a command from the first input processing unit 252A, which will be described later.

The first text information generating unit 213A generates text information on the basis of utterances of the distributing user and/or text input. For example, the first text information generating unit 213A generates text information for when the distributing user converses (chat, etc.) with watching users.

The on/off state of the first text information generating unit 213A may be switched in accordance with operations by the distributing user, for example. For example, an arrangement may be made where, in a case in which the distributing user operates a button for commenting (see operating region G101 in FIG. 11), which can be displayed in the interface display layer J2, this operation is detected by the first input detecting unit 251A, which will be described later, and the first text information generating unit 213A transitions to the on state in response to a command from the first input processing unit 252A, which will be described later. Thus, simplification (easy viewing) of the display of the interface display layer J2 can be realized, while increasing variation in operations that can be performed via the interface display layer J2.

In this case, the first information generating unit 210A may include information representing the state of the distributing user (or information representing the state of the distributor avatar M2 based thereupon) (hereinafter referred to simply as "state information of distributor avatar M2"), information of the distributor avatar M2 (e.g., avatar ID, face part ID, hairstyle part ID, clothing part ID, etc.), and speech information or text information, as a set as appropriate, in distributing user information. In this case, with respect to information that dynamically changes, such as state information of the distributor avatar M2, speech information, text information and so forth, the first information generating unit 210A may generate distributing user information in a form imparted with a timestamp. Accordingly, upon receiving such distributing user information, the terminal device 20B on the contents-watching side can output a distribution image H21 that is the distribution image H21 described above and that is accompanied by output of speech, as particular contents by the distributing user, on the basis of the distributing user information that is received.

The first communication unit 220A communicates with the server device 10 and other terminal devices 20 (e.g., the terminal device 20B on the contents-watching side). In the present embodiment, the first communication unit 220A includes a distribution processing unit 221A and the watching user information acquisition unit 222A.

The distribution processing unit 221A transmits distributing user information generated by the first information generating unit 210A to the terminal device 20B on the contents-watching side. Note that in a modification, the distribution processing unit 221A may transmit moving image data based on the distribution image H20 generated by the first drawing processing unit 200A to the terminal device 20B.

The distribution processing unit 221A may transmit distributing user information to the terminal device 20B on the contents-watching side in real-time (i.e., may realize live distribution) or may transmit distributing user information to the terminal device 20B on the contents-watching side in non-real-time, in accordance with operations or the like by the distributing user, for example. In a case of non-real-time, the distribution processing unit 221A may transmit post-editing moving image data or post-editing distributing user information, which has been manually edited by the distributing user, to the terminal device 20B on the contents-watching side.

The watching user information acquisition unit 222A acquires various types of watching user information from the terminal device 20B on the contents-watching side. The watching user information acquisition unit 222A generates the gift drawing instruction, watching user drawing instruction, comment drawing instruction, collab accepting/declining instruction, and so forth, described above, on the basis of the watching user information that is acquired. Note that the watching user information includes information necessary for generating the gift drawing instruction, watching user drawing instruction, comment drawing instruction, collab accepting/declining instruction, and so forth.

The first display unit 230A outputs the distribution image H20 for the distributing user (see FIG. 12) generated by the first drawing processing unit 200A and the home image H1 generated by the second drawing processing unit 200B, to the display unit 23 of the terminal device 20A. Note that in the present embodiment, as described above, the display unit 23 is in a form of a head-mounted display, as an example.

The drawing information for avatars (see Table 700 in FIG. 16) described above, and so forth, are stored in the first storage unit 240A.

The first user interface unit 250A detects various types of input of the distributing user via the input unit 24, and executes processing in accordance with the various types of input. The first user interface unit 250A includes the first input detecting unit 251A and the first input processing unit 252A.

The first input detecting unit 251A detects various types of input by the distributing user via the interface display layer J2 described above. For example, the first input detecting unit 251A detects input and so forth via the various types of operating regions G100 (see FIG. 11), the smartphone small-window region G120 (see FIG. 12), the operating region G300, and so forth, described above.

In this case, the first input detecting unit 251A may detect input by the distributing user via the interface display layer J2, on the basis of the state of the distributing user detected by the first detecting unit 211A, and the state of the interface display layer J2 (e.g., the positions and display states of the various types of operating regions G100 and the smartphone small-window region G120). For example, in a case of detecting a tapping action on one of the operating regions out of the various types of operating regions G100, the first input detecting unit 251A may detect a selection operation with respect to this one operating region. Thus, users can realize selection operations in virtual space by simple movements.

In the home image H1, the first input processing unit 252A executes various types of processing in accordance with various types of input detected by the first input detecting unit 251A (example of various types of second processing). The various types of processing may be any processing, and may be, for example, processing for changing placement of user interfaces (e.g., the plurality of operating regions G300 that are planar in form), processing for causing the user to relocate to any location or a particular location in virtual space (e.g., processing of relocating the distributing user to a location for distributing), or the like, as described above. Note that the various types of processing may be accompanied by various types of drawing processing and transition of screens (e.g., relocation through virtual space) by the second drawing processing unit 200B, as appropriate.

Also, in the distribution image H20 for the distributing user (see FIG. 12), the first input processing unit 252A executes various types of processing in accordance with various types of input detected by the first input detecting unit 251A (example of various types of first processing). The various types of processing may be any processing, and may be, for example, processing to start distributing particular contents, processing to end distributing particular contents, speech input processing, processing for the distributing user to receive gifts, and so forth, as described above. Note that the various types of processing may be accompanied by various types of drawing processing and transition of screens (e.g., relocation through virtual space) by the first drawing processing unit 200A. For example, processing for transitioning to a state in which processing for receiving a gift can be executed may be accompanied by drawing of notification information (notification information to the effect that a gift has been sent) by the third drawing unit 203A of the first drawing processing unit 200A, drawing of a receiving button by the second drawing unit 202A of the first drawing processing unit 200A, and so forth.

In this way, according to the present embodiment, the distribution image H20 for the distributing user has a plurality of layers as described above, and accordingly images in the distribution image H20 for the distributing user can be hierarchized, and the processing load can be efficiently reduced. For example, in a case of distributing particular contents in a moving image format, when comparing the drawing frequency of the image region of the distributing avatar display layer J0 and the image region of the interface display layer J2, drawing (updating) the image region of the distributing avatar display layer J0 more frequently than the image region of the interface display layer J2, and so forth, enables the overall processing load at the time of drawing the distribution image H20 for the distributing user to be efficiently reduced. Also, hierarchizing the distribution image H20 for the distributing user enables users to be effectively imparted with a sense of distance pertaining to "space". Also, hierarchizing the distribution image H20 for the distributing user enables the image region of each layer to be placed at an appropriate distance in accordance with attributes, for example, thereby enabling both drawing of a user interface that has high operability in a form in which simulator sickness does not readily occur, and drawing of a distributor avatar M2 that is easy to view, and so forth.

Figure 17:
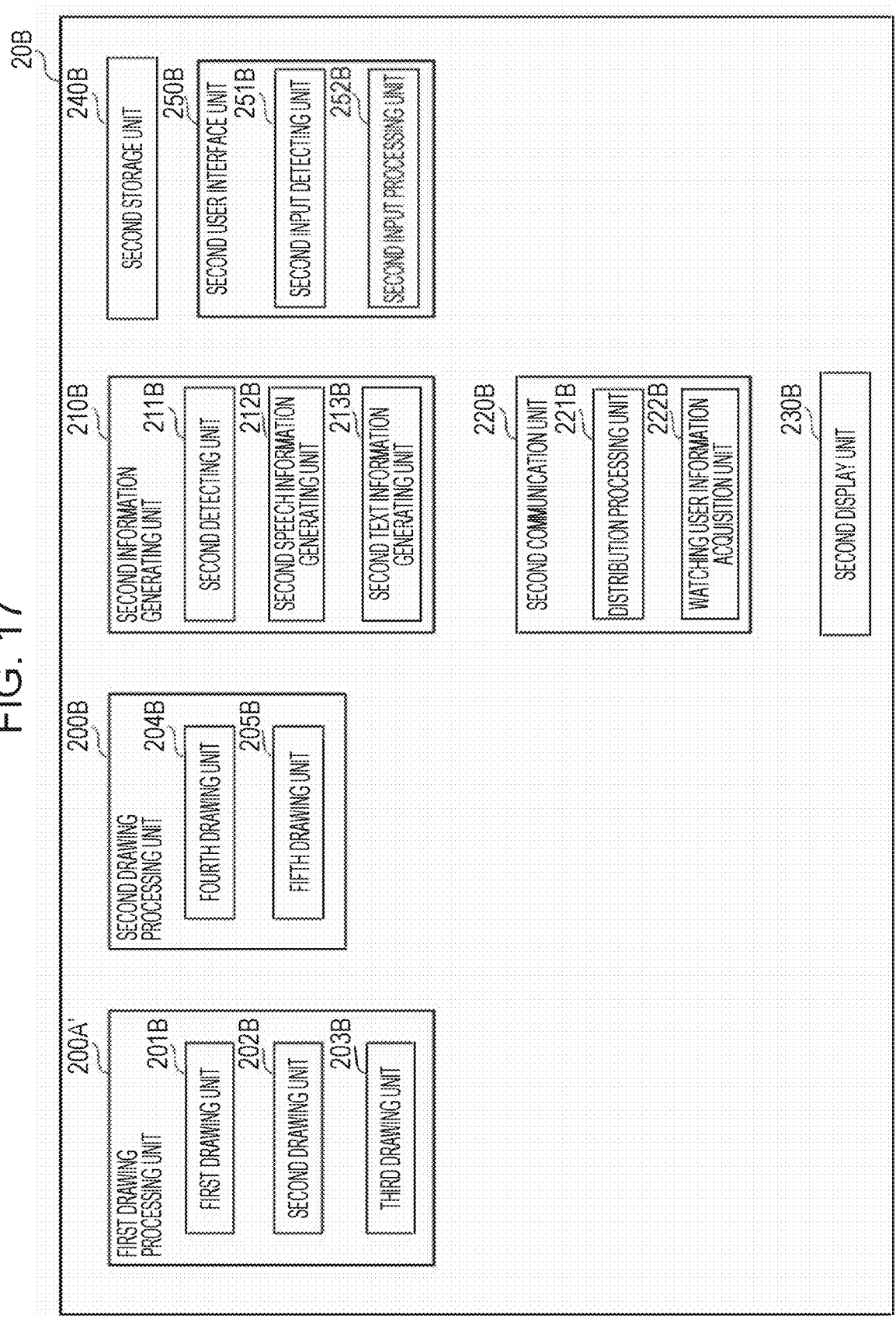
FIG. 17 is a schematic block diagram illustrating functions of a terminal device on a contents-watching side.

FIG. 17 is a schematic block diagram illustrating functions of the terminal device 20B on the contents-watching side.

As illustrated in FIG. 17, the terminal device 20B includes a first drawing processing unit 200A', the second drawing processing unit 200B, a second information generating unit 210B, a second communication unit 220B, a second display unit 230B, a second storage unit 240B, and a second user interface unit 250B.

The functions of each of the first drawing processing unit 200A', the second drawing processing unit 200B, the second information generating unit 210B, the second communication unit 220B, the second display unit 230B, and the second user interface unit 250B can be realized by the terminal control unit 25 of the terminal device 20B illustrated in FIG. 1 executing a virtual reality application in collaboration with the terminal communication unit 21, the terminal storage unit 22, the display unit 23, and the input unit 24. Also, the second storage unit 240B can be realized by the terminal storage unit 22 of the terminal device 20B illustrated in FIG. 1.

The first drawing processing unit 200A' draws the distribution image H21 for watching users (see FIG. 13), in response to a distributing user drawing instruction from a distributing user information acquisition unit 222B, which will be described later. In this case, the distributing user drawing instruction is generated on the basis of distributing user information transmitted from the terminal device 20A on the contents-distributing side (distributing user information generated at the first information generating unit 210A of the terminal device 20A). The first drawing processing unit 200A' may generate the distribution image H21 for watching users (see FIG. 13) at a frame rate corresponding to the update cycle of the distributing user information, for example.

The first drawing processing unit 200A' includes a first drawing unit 201B, a second drawing unit 202B, and a third drawing unit 203B.

The first drawing unit 201B draws the image region of the distributing avatar display layer J0 (example of a first image region) in the distribution image H21 for watching users (see FIG. 13). The distributing avatar display layer J0 in the distribution image H21 for watching users is as described above. The first drawing unit 201B may draw the distributor avatar M2 in the image region of the distributing avatar display layer J0 on the basis of distributing user information, and drawing information for avatars (see Table 700 in FIG. 16) stored in the first storage unit 240A, for example. In this case, the drawing information for avatars stored in the first storage unit 240A is used, and accordingly the distributor avatar M2 can be drawn by processing with a relatively small load.

The actions of the first drawing unit 201B have the same functions as the first drawing unit 201A at the terminal device 20A on the contents-distributing side described above. In this case, various types of information for drawing the distributor avatar M2 may be included in the distributing user drawing instruction. That is to say, the distributing user drawing instruction may include information of the distributor avatar M2 (e.g., avatar ID, and face part ID, hairstyle part ID, clothing part ID, and so forth), and information representing the state of the distributing user (or information representing the state of the distributor avatar M2 based thereupon), and so forth.

The second drawing unit 202B draws the image region of the interface display layer J2 (example of a second image region) in the distribution image H21 for watching users (see FIG. 13). The actions of the second drawing unit 202B have the same functions as the second drawing unit 202A at the terminal device 20A on the contents-distributing side described above. Note however, that an operating region that is different from the interface display layer J2 in the distribution image H20 for the distributing user (see FIG. 12) may be drawn in the interface display layer J2 in the distribution image H21 for watching users. For example, as illustrated in FIG. 13, the second drawing unit 202B may draw an operating region G108 for sending gifts to the distributing user, an operating region G109 for transmitting requests for collab distribution to the distributing user, and so forth. Note that requests for collab distribution may be makable from the distributing user side, and in this case, the operating region for transmitting requests for collab distribution to watching users may be drawn in the distribution image H20 for the distributing user (see FIG. 12). Thus, collab distribution is promoted, and interchange among users can be effectively promoted.

The third drawing unit 203B draws the image regions of the remaining layers (example of a third image region) in the distribution image H21 for watching users (see FIG. 13). The actions of the third drawing unit 203B have the same functions as the third drawing unit 203A at the terminal device 20A on the contents-distributing side described above. Note however, that what is drawn in the auxiliary information display layer J5 may be different, as appropriate. For example, the watcher avatar M1 (see FIG. 12) does not have to be drawn in the distribution image H21 for watching users, as illustrated in FIG. 13.

The second drawing processing unit 200B draws the home image H1 (see FIG. 6) (example of image of second virtual space) described above. The second drawing processing unit 200B generates the home image H1 (see FIG. 6) at a predetermined frame rate, for example.

The second drawing processing unit 200B includes the fourth drawing unit 204B and the fifth drawing unit 205B. The second drawing processing unit 200B may be substantially the same as the second drawing processing unit 200B of the terminal device 20A. Thus, an efficient configuration that uses shared hardware resources can be realized.

The second information generating unit 210B generates various types of watching user information relating to the watching user. The various types of watching user information include information representing the state of the watching user (state of the watching user detected by a second detecting unit 211B) used by the second user interface unit 250B, which will be described later. Also, the various types of watching user information include information necessary for generating the gift drawing instruction, watching user drawing instruction, comment drawing instruction, collab accepting/declining instruction, and so forth, at the watching user information acquisition unit 222A of the terminal device 20A on the contents-distributing side, described above.

In the present embodiment, the second information generating unit 210B includes the second detecting unit 211B, a second speech information generating unit 212B, and a second text information generating unit 213B.

The second detecting unit 211B detects the state of the watching user (the orientation and position, movement, or the like, of the user). The second detecting unit 211B may detect the state of the watching user via the input unit 24 described above.

In a state in which the home image H1 is drawn, the second detecting unit 211B may detect the state of the watching user at a cycle in accordance with the frame rate of the home image H1, for example. Also, in a state in which the distribution image H21 for watching users (see FIG. 13) is drawn, the second detecting unit 211B may detect the state of the watching user at a cycle corresponding to a cycle for updating distributing user information, for example.

The second speech information generating unit 212B generates speech information based on utterance of the watching user. For example, the second speech information generating unit 212B generates speech information of the watching user via a microphone or the like of the input unit 24. Note that the second speech information generating unit 212B may process the speech data acquired via the input unit 24 to generate speech information of the watching user. In this case, the processing method may be selectable by the watching user, or processing of the speech data may be realized manually by the watching user.

The on/off state of the second speech information generating unit 212B may be switched in accordance with operations by the watching user, for example. For example, an arrangement may be made where, in a case in which the watching user operates a mute button (omitted from illustration), which can be displayed in the interface display layer J2 in the distribution image H21 for watching users (see FIG. 13), this operation is detected by a second input detecting unit 251B, which will be described later, and the second speech information generating unit 212B transitions to the off state in response to a command from a second input processing unit 252B, which will be described later.

The second text information generating unit 213B generates text information on the basis of utterances of the watching user and/or text input. For example, the second text information generating unit 213B generates text information for when the watching user converses (chat, etc.) with the distributing user.

The on/off state of the second text information generating unit 213B may be switched in accordance with operations by the watching user, for example. For example, an arrangement may be made where, in a case in which the watching user operates a button for commenting (omitted from illustration in FIG. 13), which can be displayed in the interface display layer J2, this operation is detected by the second input detecting unit 251B, which will be described later, and the second text information generating unit 213B transitions to the on state in response to a command from the second input processing unit 252B, which will be described later. Thus, simplification (easy viewing) of the display of the interface display layer J2 can be realized, while increasing variation in operations that can be performed via the interface display layer J2.

In this case, the second information generating unit 210B may include information representing the state of the watching user (or information representing the state of the watcher avatar M1 based thereupon) (hereinafter referred to simply as "state information of watcher avatar M1"), and information of the watcher avatar M1 (e.g., avatar ID, face part ID, hairstyle part ID, clothing part ID, etc.), and speech information as appropriate, as a set, in watching user information.

In this case, with respect to information that dynamically changes, such as state information of the watcher avatar M1, speech information, and so forth, the second information generating unit 210B may generate watching user information in a form imparted with a timestamp. Accordingly, upon receiving such watching user information, the terminal device 20A on the contents-distributing side can draw the watcher avatar M1 in the user avatar display layer J1 in the distribution image H20 such as described above, on the basis of the watching user information that is received.

The second communication unit 220B communicates with the server device 10 and other terminal devices 20 (e.g., the terminal device 20A on the contents-distributing side). In the present embodiment, the second communication unit 220B includes a distribution processing unit 221B and the distributing user information acquisition unit 222B.

The distribution processing unit 221B transmits watching user information generated by the second information generating unit 210B to the terminal device 20A on the contents-distributing side.

The distributing user information acquisition unit 222B acquires distributing user information from the terminal device 20A on the contents-distributing side, and gives the distributing user drawing instruction described above to the first drawing processing unit 200A'. The distributing user information is generated by the distribution processing unit 221A of the terminal device 20A on the contents-distributing side, as described above.

The second display unit 230B outputs the distribution image H20 and the home image H1 generated by the first drawing processing unit 200A' and the second drawing processing unit 200B, to the display unit 23 of the terminal device 20B. Note that in the present embodiment, as described above, the display unit 23 is in a form of a head-mounted display, as an example.

The drawing information for avatars (see Table 700 in FIG. 16) described above, and so forth, are stored in the second storage unit 240B.

The second user interface unit 250B detects various types of input of the watching user via the input unit 24, and executes processing in accordance with the various types of input. The second user interface unit 250B includes the second input detecting unit 251B and the second input processing unit 252B.

The second input detecting unit 251B detects various types of input by the watching user via the interface display layer J2 described above. For example, the second input detecting unit 251B detects input and so forth via the interface display layer J2 drawn by the second drawing unit 202B and the fourth drawing unit 204B described above.

In this case, the second input detecting unit 251B may detect input by the watching user via the interface display layer J2, on the basis of the state of the watching user detected by the second detecting unit 211B, and the state of the interface display layer J2 (e.g., the positions and display states of the various types of operating regions G100 and the smartphone small-window region G120). For example, in the home image H1, the second input detecting unit 251B detects various types of operations by the watching user with respect to the plurality of operating regions G300 that are planar in form described above, and detects various types of operations by the watching user with respect to the various types of operating regions (operating regions for transmitting requests for collab distribution to the distributing user, etc.) in the distribution image H21 for watching users (see FIG. 13), and so forth.

In the home image H1, the second input processing unit 252B executes various types of processing in accordance with various types of input detected by the second input detecting unit 251B (example of various types of second processing). The various types of processing may be any processing, and may be, for example, processing for changing placement of user interfaces (e.g., the plurality of operating regions G300 that are planar in form), processing for causing the user to relocate to any location or a particular location in virtual space (e.g., processing of relocating the watching user to a location for watching), or the like, as described above. Note that the various types of processing may be accompanied by various types of drawing processing and transition of screens (e.g., relocation through virtual space) by the second drawing processing unit 200B, as appropriate. For example, processing for transitioning to a state in which processing for sending a gift can be executed may be accompanied by the fourth drawing unit 204B of the second drawing processing unit 200B drawing a screen for selecting a gift, and so forth.

Also, in the distribution image H21 for watching users (see FIG. 13), the second input processing unit 252B executes various types of processing in accordance with various types of input detected by the second input detecting unit 251B (example of various types of second processing). The various types of processing may be any processing, and may be, for example, processing to end watching particular contents, speech input processing, processing for sending a gift to the distributing user, and so forth, as described above. Note that the various types of processing may be accompanied by various types of drawing processing and transition of screens (e.g., relocation through virtual space) by the first drawing processing unit 200A', as appropriate. For example, processing for sending a gift to the distributing user may be accompanied by the third drawing unit 203B of the first drawing processing unit 200A' drawing notification information (notification information to the effect that the gift has been received), and so forth.

Figure 18:
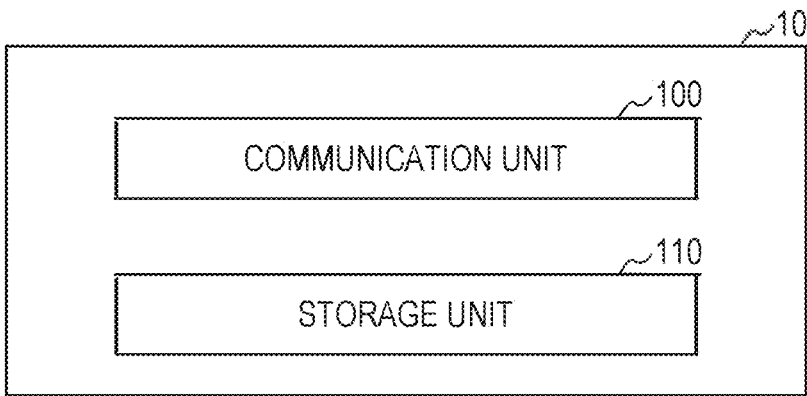
FIG. 18 is a schematic block diagram illustrating functions of a server device.

FIG. 18 is a schematic block diagram illustrating functions of the server device 10.

The server device 10 primarily includes a communication unit 100 and a storage unit 110.

The communication unit 100 is capable of communication of various types of information (e.g., distributing user information, watching user information, and so forth), necessary for distribution and/or watching of particular contents by the distributing user, with the terminal device 20A on the contents-distributing side and/or the terminal device 20B on the contents-watching side.

The storage unit 110 is capable of storing various types of information necessary for distribution and/or watching of particular contents by the distributing user.

In this way, according to the present embodiment, the distribution image H21 for watching users has a plurality of layers as described above, and accordingly images in the distribution image H21 for watching users can be hierarchized, and the processing load can be efficiently reduced. For example, within the interface display layer J2, drawing (updating) the image region in a region at the front as viewed from the viewpoint of the user more frequently than other image regions, and so forth, enables the overall processing load at the time of drawing the distribution image H21 for watching users to be efficiently reduced. Also, hierarchizing the distribution image H21 for watching users enables users to be effectively imparted with a sense of distance pertaining to "space". Also, hierarchizing the distribution image H21 for watching users enables the image region of each layer to be placed at an appropriate distance in accordance with attributes, for example, thereby enabling both drawing of a user interface that has high operability in a form in which simulator sickness does not readily occur, drawing of operating regions G300 and so forth that are easy to view, and so forth to be realized, for example.

Note that in the present embodiment, the server device 10 does not have drawing functions of the home image H1 and the distribution image H2 described above, and these drawing functions are realized by the terminal device 20A on the contents-distributing side and/or the terminal device 20B on the contents-watching side, as described above. However, part or all of the drawing functions of the home image H1 and/or the distribution image H2 may be realized by the server device 10. This may be the same as appropriate regarding functions other than drawing functions.

Next, an example of actions performed in the virtual reality generating system 1 illustrated in FIG. 1 will be described with reference to FIG. 19 and subsequent drawings.

Figure 19:
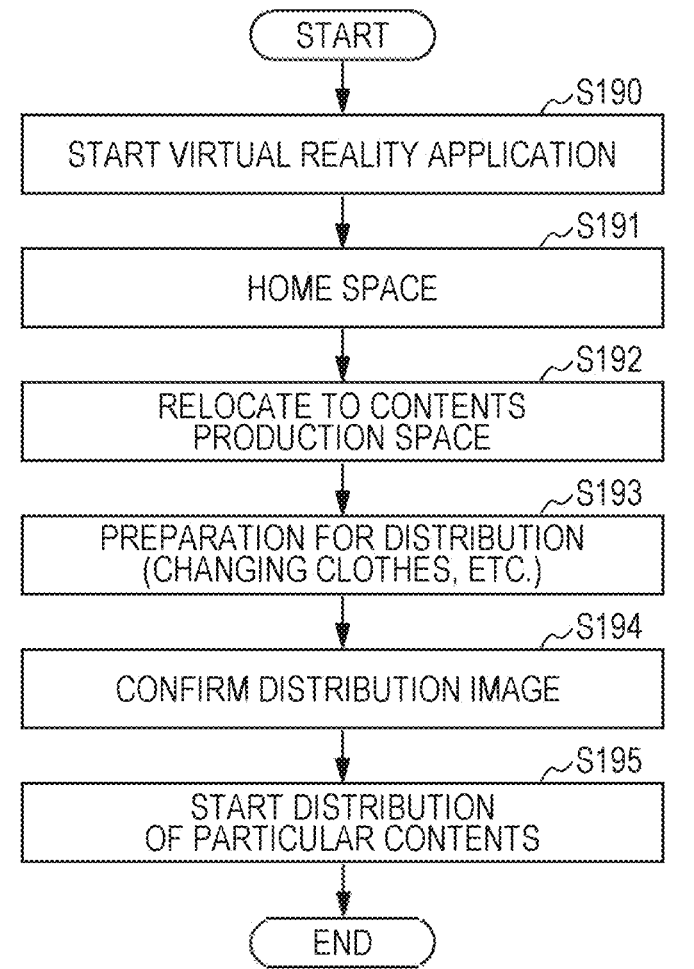
FIG. 19 is a flowchart showing an example of actions leading up to starting of distribution of particular contents.

FIG. 19 is a flowchart showing an example of actions, which are actions of the terminal device 20A on the contents-distributing side performed in the virtual reality generating system 1 illustrated in FIG. 1, leading up to starting of distribution of particular contents.

First, in step S190, a user to serve as a distributing user wears the terminal device 20A that is a head-mounted display, and activates a virtual reality application. Thus, the user is situated within the home space (step S191), and can view the home image H1. The user operates an operating region of the interface display layer J2 in the home image H1, and relocates to the contents production space (step S192). Upon relocating to the contents production space, the distributing user performs preparation of the distributor avatar M2, such as changing clothing and so forth as appropriate (step S193), and thereafter stands in front of the mirror 805 and views the distribution image H20 (preparation image before distribution) (step S194). Note that the distribution image H20 serving as the preparation image before distribution may include just the distributing avatar display layer J0 and the interface display layer J2, or may include just the distributing avatar display layer J0, the interface display layer J2, and the background layer J3. Note that the operating region G107 (see FIG. 11) for starting distribution may be drawn in the interface display layer J2 in the distribution image H20 serving as the preparation image before distribution. Also, in another embodiment, distribution may be started at the same time as relocating to the contents production space.

Upon viewing the distribution image H20 and deciding to start the distribution, the distributing user operates the corresponding operating region G107 (see FIG. 11) in the interface display layer J2, and starts distribution of particular contents including the distribution image H20 (step S195). Upon distribution of particular contents being started in this way, an operating region G300 (see FIGS. 6 and 7A, etc.) by which these particular contents can be selected is drawn in the interface display layer J2 in the home image H1 of the terminal device 20B on the contents-watching side.

Figure 20:
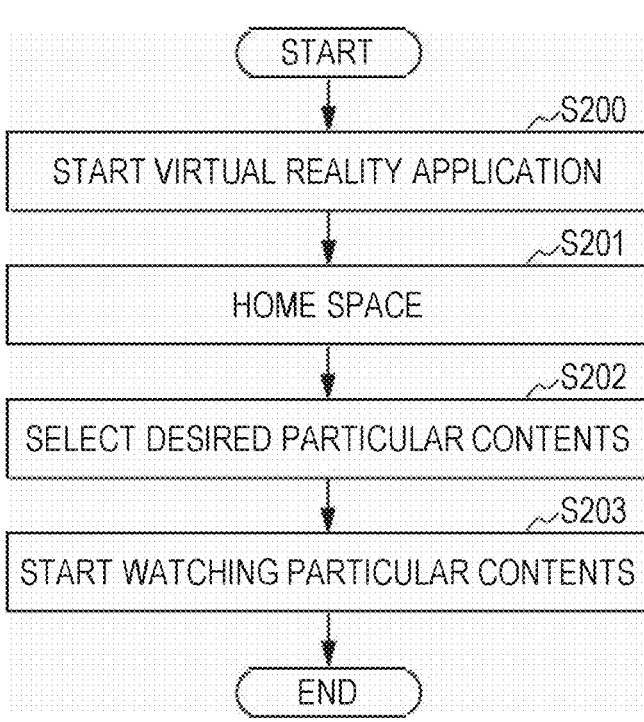
FIG. 20 is a flowchart showing an example of actions leading up to starting of watching of the particular contents.

FIG. 20 is a flowchart showing an example of actions, which are actions of the terminal device 20B on the contents-watching side performed in the virtual reality generating system 1 illustrated in FIG. 1, leading up to starting of watching of particular contents.

First, in step S200, a user to serve as a watching user wears the terminal device 20B that is a head-mounted display, and activates a virtual reality application. Thus, the user is situated within the home space (step S201), and can view the home image H1. The user operates an operating region G300 in the interface display layer J2 in the home image H1 to select desired particular contents (step S202). Thus, the watching user can start watching the particular contents (step S203).

Figure 21:
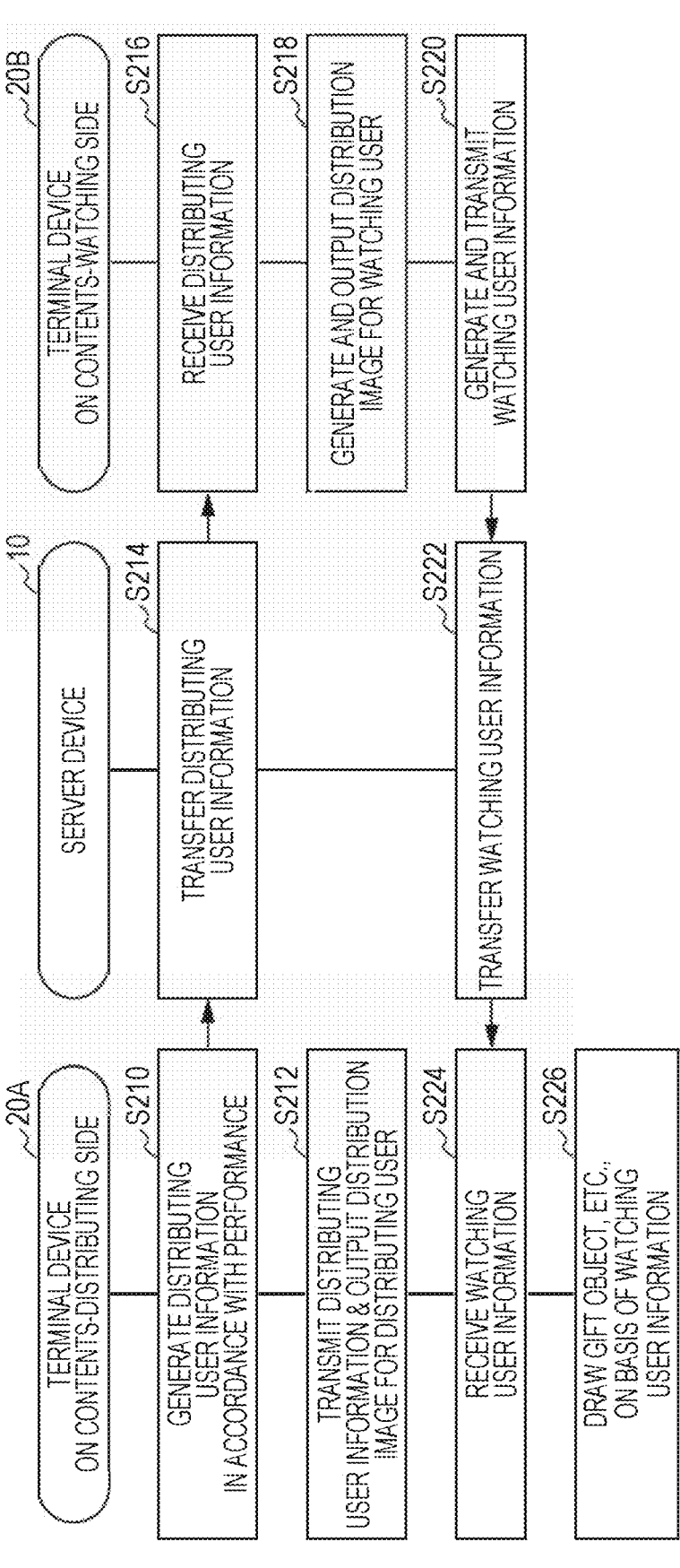
FIG. 21 is a flowchart showing an example of actions during distribution of the particular contents by the distributing user (i.e., during watching of the particular contents by a watching user).

FIG. 21 is a flowchart showing an example of actions, which are actions of the terminal device 20A on the contents-distributing side, the terminal device 20B on the contents-watching side, and the server device 10, performed in the virtual reality generating system 1 illustrated in FIG. 1, during distribution of particular contents by the distributing user (i.e., watching of particular contents by the watching user).

Note that in FIG. 21, actions performed by one terminal device 20A on the contents-distributing side are shown to the left side, actions performed by the server device 10 (one server device 10 here) are shown at the middle, and actions performed by one terminal device 20B on the contents-watching side are shown to the right side.

In step S210, the distributing user gives a performance or the like in front of the mirror 805. Accordingly, the terminal device 20A on the contents-distributing side generates distributing user information in accordance with the performance or the like. The terminal device 20A on the contents-distributing side transmits such distributing user information to the server device 10. Note that as long as a condition is satisfied that a correlative relation between information to be transmitted (that has been transmitted) and a time stamp based on a reference time is clearly understood at both the terminal device 20A on the contents-distributing side and the terminal device 20B on the contents-watching side, the distributing user information may be transmitted to the server device 10 in a state multiplexed with each other by any multiplexing format. As long as such a condition is satisfied, upon receiving the distributing user information, the terminal device 20B on the contents-watching side can appropriately perform processing thereof following the time stamp corresponding to the distributing user information. With regard to the multiplexing format, distributing user information may each be transmitted via separate channels, or part of the distributing user information may be transmitted via the same channel. Channels can include time slots, frequency bands, and/or spread code or the like. Note that the distribution method of moving images (particular contents) using reference time may be realized by a form disclosed in Japanese Patent No. 6803485, which is incorporated in the present specification by reference herein.

Next, in parallel with the actions in step S210, the terminal device 20A on the contents-distributing side in step S212 continuously transmits distributing user information, for drawing the distribution image H21 for watching users, to the terminal device 20B on the contents-watching side, and also outputs the distribution image H20 (see FIG. 12) for the distributing user to the terminal device 20A on the contents-distributing side.

The terminal device 20A on the contents-distributing side can perform the actions of steps S210 and S212 in parallel with the actions of steps S214 to S222, which will be described below.

Next, in step S214, the server device 10 transmits (transfers) distributing user information that is continuously transmitted from the terminal device 20A on the contents-distributing side, to the terminal device 20B on the contents-watching side.

In step S216, the terminal device 20B on the contents-watching side receives the distributing user information from the server device 10, and stores the distributing user information in the second storage unit 240B. In an embodiment, the terminal device 20B on the contents-watching side can temporarily store (buffer) the distributing user information received from the server device 10 in the terminal storage unit 22 (see FIG. 1), taking into consideration a possibility that the speech information has a greater data amount as compared with other information, and/or a possibility that a failure will occur on the communication line.

In parallel with such reception and storage of distributing user information, in step S218, the terminal device 20B on the contents-watching side uses the distributing user information that is received from the terminal device 20A on the contents-distributing side via the server device 10, and stored, to generate the distribution image H21 for watching users, and plays the particular contents.

In parallel with the actions in steps S216 and S218 described above, in step S220, the terminal device 20B on the contents-watching side generates watching user information, and transmits the watching user information to the terminal device 20A on the contents-distributing side via the server device 10. An arrangement may be made in which the watching user information is only generated in a case in which the watching user performs an operation to send a gift, or the like, for example.

In step S222, the server device 10 transmits (transfers) the watching user information received from the terminal device 20B on the contents-watching side to the terminal device 20A on the contents-distributing side.

In step S224, the terminal device 20A on the contents-distributing side can receive the watching user information via the server device 10.

In step S226, the terminal device 20A on the contents-distributing side can perform basically the same actions as those in step S210. For example, the terminal device 20A on the contents-distributing side generates a gift drawing instruction on the basis of the watching user information received in step S224, and draws a corresponding gift object in the auxiliary information display layer J5 in the distribution image H20.

Thus, the processing shown in FIG. 21 may be continuously executed until distribution of the particular contents by the distributing user ends, or until the watching user watching the particular contents leaves.

Note that in the example shown in FIG. 21, the executing entity of each part of the processing can be changed in various types of forms, as described above. For example, out of the processing in step S212, the processing for generating the distribution image H20 for the distributing user may be realized at the server device 10 instead of at the terminal device 20A. Also, out of the processing in step S218, the processing of generating the distribution image H21 for watching users may be realized at the terminal device 20A or at the server device 10. In this case, data of the distribution image H21 for watching users may be received in step S216, instead of distributing user information. Also, out of the processing in step S226, the processing for drawing a gift object in the auxiliary information display layer J5 in the distribution image H20 on the basis of watching user information may be realized at the server device 10 instead of at the terminal device 20A.

Figure 22:
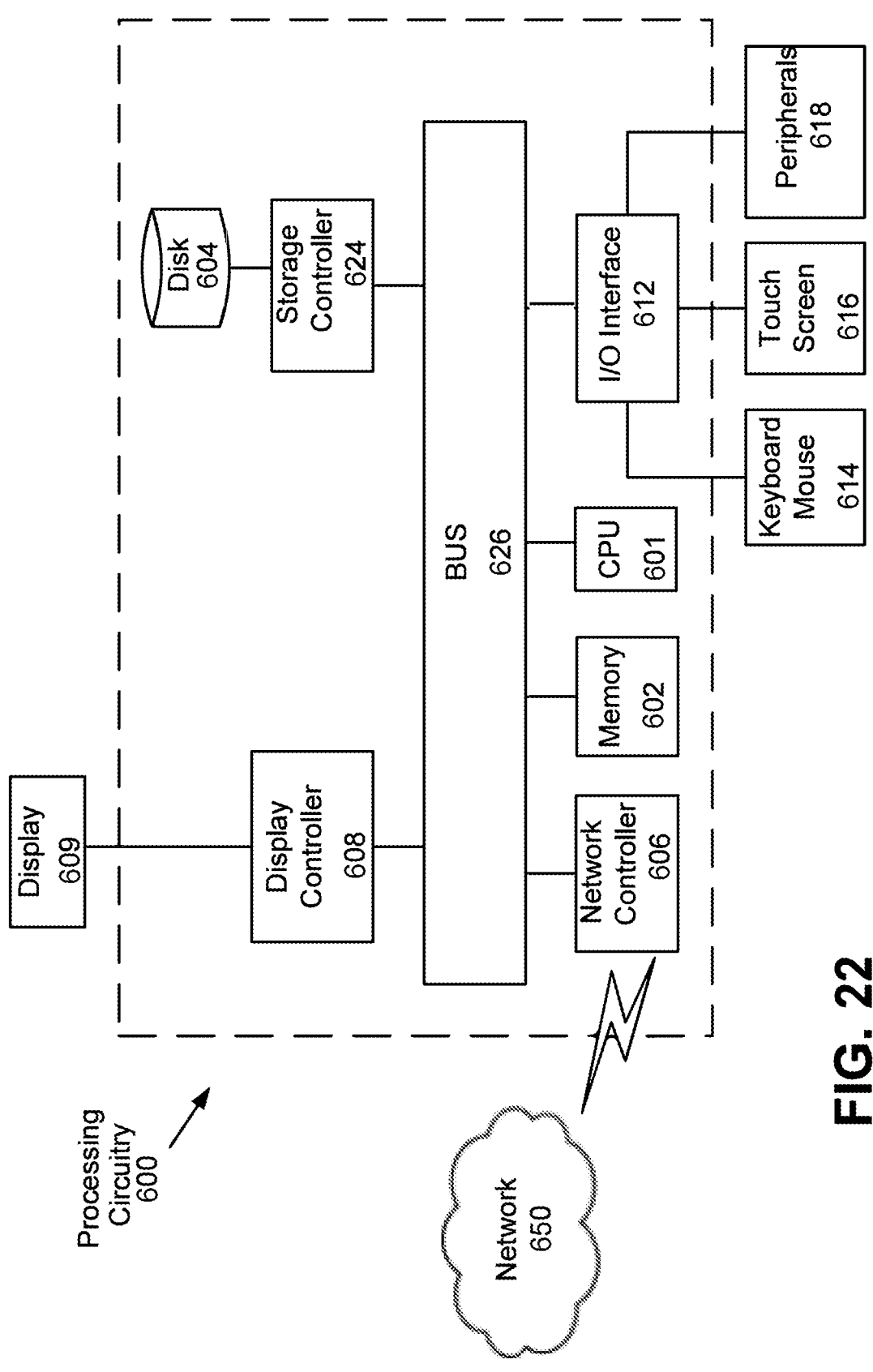
FIG. 22 is a block diagram of processing circuitry that performs computer-based operations in accordance with the present disclosure.

FIG. 22 is a block diagram of processing circuitry that performs computer-based operations in accordance with the present disclosure. FIG. 22 illustrates processing circuitry 600, which may be a component of server device 10, terminal device 20 and/or studio unit 30 or each respective devices subcomponents.

Processing circuitry 600 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 22, the processing circuitry 600 includes a CPU 601 which performs one or more of the control processes discussed in this disclosure. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 600 communicates, such as a server or computer. The processes may also be stored in network based storage, cloud-based storage or other mobile accessible storage and executable by processing circuitry 600.

Further, the claimed advancements may be provided as a utility application, background daemon, or component of an operating system, or combination thereof, executing in conjunction with CPU 601 and an operating system such as Microsoft Windows, UNIX, Solaris, LINUX, Apple MAC-OS, Apple iOS and other systems known to those skilled in the art.

The hardware elements in order to achieve the processing circuitry 600 may be realized by various circuitry elements. Further, each of the functions of the above described embodiments may be implemented by circuitry, which includes one or more processing circuits. A processing circuit includes a particularly programmed processor, for example, processor (CPU) 601, as shown in FIG. 22. A processing circuit also includes devices such as an application specific integrated circuit (ASIC) and conventional circuit components arranged to perform the recited functions.

In FIG. 22, the processing circuitry 600 may be a computer or a particular, special-purpose machine. Processing circuitry 600 is programmed to execute control processing and to perform the processes of the devices respective sub-components.

Alternatively, or additionally, the CPU 601 may be implemented on an FPGA, ASIC, PLD or using discrete logic circuits, as one of ordinary skill in the art would recognize. Further, CPU 601 may be implemented as multiple processors cooperatively working in parallel to perform the instructions of the inventive processes described above.

The processing circuitry 600 in FIG. 22 also includes a network controller 606, such as an Ethernet PRO network interface card, for interfacing with network 650. As can be appreciated, the network 650 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 650 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 606 may be compliant with other direct communication standards, such as Bluetooth, a near field communication (NFC), infrared ray or other.

The processing circuitry 600 further includes a display controller 608, such as a graphics card or graphics adaptor for interfacing with display 609, such as a monitor. An I/O interface 612 interfaces with a keyboard and/or mouse 614 as well as a touch screen panel 616 on or separate from display 609. I/O interface 612 also connects to a variety of peripherals 618.

The storage controller 624 connects the storage medium disk 604 with communication bus 626, which may be an ISA, EISA, VESA, PCI, or similar, for interconnecting all of the components of the processing circuitry 600. A description of the general features and functionality of the display 609, keyboard and/or mouse 614, as well as the display controller 608, storage controller 624, network controller 606, and I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Modification

Although the embodiment described above has been described with respect to a form using worn devices (head-mounted displays) as the terminal devices 20A and 20B, the virtual reality generating system 1 according to the present disclosure may be configured as a metaverse (virtual space on the Internet), using smartphones, tablet terminals, personal computers (PCs), or the like, as the terminal device 20A (example of a first terminal device) and the terminal device 20B (example of a second terminal device). A modification will be described below in a case of employing such a form, in which forms of scenes that can be set, switching of screens, and a user interface (UI), will be described as points regarding a case of an arrangement configured as a metaverse. With regard to matters that are not mentioned in the following description, the description of the embodiment given above is applied within a technically reasonable scope. Note that in the following, the user interface is realized by the input unit 24, the first user interface unit 250A, and/or the second user interface unit 250B, in the embodiment described above.

First, scenes that can be set in a case of an arrangement configured as a metaverse, and the user interface in each scene, will be described.

In a scene in which users are watching together (hereinafter referred to as "community watching"), operations such as play, stop, language settings, and so forth, are preferably in a hierarchical menu in the user interface. That is to say, even in a case of community watching using one large screen, preferably, volume, closed-caption language settings, play, stop, fast forward, and so forth are individually operatable, and in addition to direct operations, authority settings thereof are hierarchized. Examples of user interfaces may include forms such as [play moving image>display list>community watching/just me>fixed here/everybody operate], [screen operations while playing> (in case of having authority) play/stop/fast forward/rewind/ end], and so forth.

In a scene of imparting emoting (expression of emotions) to avatars, the users have their lines of sight directed toward the screen during community watching, and accordingly, instead of selecting emoting by normal expressions, an arrangement is preferable in which settings are quickly made more simply and while clearly indicating a targeted direction (e.g., semiauto). Examples of user interfaces may include forms such as [community watching screen>spectator mode>up-down-right-left of stick change to {smile mark, heart mark, applause mark, semiauto}], [semiauto>follow when others react/automatically react to cheers to video], and so forth.

In a presentation mode, which is a scene in which a user gives a presentation as a lecturer, an arrangement may be made in which a script, material regarding which sharing on-screen is desired, a display user interface thereof, and so forth are visible to the lecturer, out of the users, but neither the menu nor the user interface are displayed to other users (except that virtualcasting is displayed). Examples of user interfaces may include forms such as [turn to next page/text to speak now/next image], and so forth, for example. The user who is the lecturer is not in a position to be looking behind him/herself, and accordingly operations previewing, and prepared images and text will be displayed on the screen.

In a seated answering mode, which is a scene in which users rapidly answer just from options, such as for a quiz show or online education, an example of a user interface may be options for answers, and a hand-raising button, which are displayed to individual users, for example. Upon the user interface being specified by an organizer so as not to be overfree, the user interface is fixed until certain conditions are satisfied. The problem and options for answers are a set, and may include a timer, scores, numbers of coins to be bet, and so forth.

In a placement mode, which is a scene in which a building is placed, the layers will be a form such as [placement-→shop→outdoor→purchase (balance, settlement, loan) →finalize→location→orientation→operation of other users enabled/disabled . . . ]. However, directly placing this in three-dimensional space only enables handling such as "holding and dropping", and accordingly matching the orientation is difficult. Further, subsequent attribute settings such as "whether or not others can see, touch, relocate" are difficult. Accordingly, examples of user interfaces may include a form such as [freely walk in three-dimensional space→open menu→shop] or the like, for example. At this time, an arrangement may be made in which the three-dimensional space is faintly displayed in the background of a two-dimensional shop screen, and the menu and shop are not visible to others. While this is displayed, the avatar is displayed as being immovable with a magnifying lens mark floating above the head, in a state such that others can understand that the task of "shop" is being undertaken. In a cases of an object placement in which placement is decided and there is conflict with another person, "planned construction site" is displayed for others, and in a case in which another user is there, the processing goes into standby. In a case in which the situation is not resolved after waiting for a predetermined amount of time, a confirmation screen may be returned to again, and cancelling may cause returning one step with respect to placement location and orientation.

Next, screen switching and user interfaces in a case of configuration as a metaverse will be described.

Operating by first-person perspective alone with regard to the viewpoint of the user is problematic when viewing from a bird's-eye view or third-person view is desired. Accordingly, an arrangement may be made in which selecting [bird's-eye view] in the user interface enables a state of viewing from a bird's-eye view. Examples of user interfaces may include a form such as [menu→drone photo→OK to enter drone operation mode]. At this time, an arrangement may be made in which the avatar is fixed, and aerial photos can be taken from the drone operated by the stick, while emoting or making hand motions. With regard to a layout view when taking a screen shot, a confirmation screen such as "share?" may be displayed in conjunction with a continuous-shooting mode. Examples of user interfaces may include a form such as [open film roll→array several past shots and select right-left/decide operations such as share/filter/layout (portrait, landscape, square)/delete, and so forth, by up-down].

With regard to a game view when gaming in a metaverse space (in-space game), judgements and score sheets are displayed in accordance with rules of the game. Also, information for assisting with the game (e.g., a target pin in a case of a bowling game, and the forms of the fingers which an opponent has made so far in a case of a rock paper scissors game) may be displayed. On the other hand, depending on the nature of the game, switching out weapons, displaying hit points (HP) of an opponent, communication with members of own group, and so forth, are information that the player does not want other users to see, and accordingly may be made to not be shown.

In a case in which the game is operating a vehicle, such as a car racing game for example, a standings display, a map display, and so forth, may be displayed. In a case of a car racing game, control is performed for replacement with steering wheel operations. When selecting to enter the car, the user interface is restricted to a driving UI. An arrangement may be made such that when in this mode, a hand controller is used not for the hands, but instead for operations of the steering wheel, accelerator, and brakes, with right-left actions operating the steering wheel, and up-down actions operating gearshift and accelerator/brakes.

Besides the above, a view relating to smartphone compatibility may be displayed, for example. Unlike a so-called virtual smartphone display, this relates to decision of purchasing a smartphone, in which decision and so forth is facilitated by displaying a user interface (smartphone UI) in the screen in a form so as to hide a three-dimensional background. The user interface can be defined in accordance with the environment of the user, such as for example, how to use a trackpad and stick implemented in a wide variety of hand controllers (swiping, touching, long-pressing, dragging, etc.). Note that including the hand controller in the car racing game described above, the hand controller, trackpad, and stick as used here may be actual items, or may be virtual items drawn in virtual space.

Although an embodiment of the present disclosure has been described so far in detail with reference to the drawings, specific configurations are not limited to this embodiment, and designs without departing from the essence of the present disclosure are included.

What is claimed is:

1. An information processing system, comprising:
   processing circuitry configured to
      detect a state of a first user that distributes content including an image of a first virtual space, wherein the image includes a plurality of layers and the first virtual space is a three-dimensional virtual reality environment;
      display the image of the first virtual space, which is viewable by the first user watching the content via a first terminal device relating to the first user or is viewable by a second user watching the content via a second terminal device relating to the second user; and
      store a first avatar associated with the first user, wherein to display the image of the first virtual space, the processing circuitry is configured to
      generate a first image region of a first layer, of the plurality of layers, including the first avatar, and
      generate a second image region of a second layer, of the plurality of layers, including a first user interface,
   the first layer is situated at a first distance within the three-dimensional virtual reality environment as viewed from the first user,
   the second layer is situated at a second distance within the three-dimensional virtual reality environment as viewed from the first user, the second distance being farther from the first user than the first distance, and
   the processing circuitry is further configured to change a state of the first avatar in the first image region of the first layer based on the detected state of the first user.

2. The information processing system according to claim 1, wherein
   the first avatar is in a form of a character having a frontal direction,
   the processing circuitry detects, as the state of the first user, at least one user information of orientation, position, and movement of the first user in a real space, and

the processing circuitry generates the first image region in which at least one of orientation, position, and movement of the character is realized in accordance with the user information.

3. The information processing system according to claim 1, wherein the processing circuitry generates the first avatar in a semitransparent manner.

4. The information processing system according to claim 1, wherein the first avatar is an avatar of the first user, and the processing circuitry generates the first image region by placing the first avatar in the first virtual space, based on an image reflected in a mirror provided in the first virtual space.

5. The information processing system according to claim 4, wherein to display the image, the processing circuitry is further configured to generate a third image region of at least one of, out of the plurality of layers, a layer relating to a background, and a layer that situated is on a side of the background that is closer to a viewpoint for the first user than to the background, and also on a side of the second image region that is farther from the viewpoint for the first user than the second image region.

6. The information processing system according to claim 5, wherein the processing circuitry is configured to include, in the third image region, information relating to the second user.

7. The information processing system according to claim 6, wherein the processing circuitry is further configured to store a second avatar associated with the second user, and generates the second avatar as the information relating to the second user.

8. The information processing system according to claim 5, wherein the processing circuitry is configured to include, in the third image region, at least one of input information from the second user, guidance/notification information to the first user and/or the second user, and item information including a gift object that is sent to the first user.

9. The information processing system according to claim 1, wherein the processing circuitry is further configured to detect an input by the first user via the first user interface, based on the detected state of the first user, and a state of the second image region, and execute a first processing in accordance with the input.

10. The information processing system according to claim 9, wherein the first processing includes any of processing to start distributing of the content, processing to end distributing of the content, processing of sound input, processing for receiving a gift, processing of displaying an image for an item in association with the first avatar, processing for selecting/exchanging an item that is displayable in association with the first avatar, processing for text input, processing for accepting other users, processing for changing a value of a parameter of the content, and processing for transitioning to a state in which another processing can be executed.

11. The information processing system according to claim 1, wherein the processing circuitry is further configured to display another image of a second virtual space, the other image being viewable by the first user via the first terminal device or the second user via the second terminal device, the other image includes a plurality of layers, and to display the other image, the processing circuitry is further configured to generate a fourth image region of a layer, of the plurality of layers, relating to a second user interface, and generate a fifth image region of a layer, of the plurality of layers, that is situated on a side behind the fourth image region as viewed from a viewpoint for the first user or the second user, and generate a plurality of operating regions that are planar in form and that relate to the second user interface, in a form placed following a spherical face or a curved face.

12. The information processing system according to claim 11, wherein the processing circuitry generates, at a position corresponding to a position of the second user in the second virtual space, at least part of the plurality of operating regions that are planar in form, in a plurality of rows following a first curved face, about a predetermined reference axis that extends in an up-down direction of the second virtual space.

13. The information processing system according to claim 12, wherein the processing circuitry generates another part of the plurality of operating regions that are planar in form in a plurality of rows following a second curved face that is offset to a side behind the first curved face about the predetermined reference axis as viewed from the viewpoint for the first user or the second user.

14. The information processing system according to claim 13, further comprising:

another processing circuitry configured to detect a state of the second user that enters the second virtual space;

detect input by the second user via the second user interface, based on the state detected of the second user and a state of the fourth image region; and execute a second processing in accordance with the detected input by the second user.

15. The information processing system according to claim 14, wherein the second processing includes any of processing of changing placement of the second user interface, processing of relocating the first user to any location or a particular location in the first virtual space, processing to start distributing the content, processing to start watching the content, processing to end watching the content, sound input processing, processing of sending a gift, processing of displaying an image for an avatar item, processing for selecting/exchanging an avatar item, processing for text input, and processing for transitioning to a state in which another processing can be executed.

16. The information processing system according to claim 11, wherein the fifth image region includes an image region of a layer, of the plurality of layers, relating to a background, and an image region that is a layer, of the plurality of layers, situated at a side of the background that is closer to the viewpoint for the first user or the second user than the background, and that includes information relating to at least part of the plurality of operating regions that are planar in form.

17. An information processing method that is executed by a computer, the information processing method comprising:

detecting a state of a first user that distributes content including an image of a first virtual space, wherein the image includes a plurality of layers and the first virtual space is a three-dimensional virtual reality environment;

performing first display processing of displaying the image of the first virtual space, which is viewable by the first user watching the content via a first terminal device relating to the first user or is viewable by a second user watching the content via a second terminal device relating to the second user; and storing a first avatar associated with the first user, wherein the performing the first display processing includes:

first generating a first image region of a first layer, of the plurality of layers, including the first avatar, and second generating a second image region of a second layer, of the plurality of layers, including a first user interface, the first layer is situated at a first distance within the three-dimensional virtual reality environment as viewed from the first user, the second layer is situated at a second distance within the three-dimensional virtual reality environment as viewed from the first user, the second distance being farther from the first user than the first distance, and the first generating includes changing a state of the first avatar in the first image region of the first layer based on the detected state of the first user.

18. The information processing method according to claim 17, further comprising:

performing second display processing of displaying another image of a second virtual space, the other image being viewable by the first user via the first terminal device or the second user via the second terminal device, wherein the other image includes a plurality of layers, and the performing the second display processing includes:

third generating a third image region of a layer, of the plurality of layers, relating to a second user interface, and fourth generating a fourth image region of a layer, of the plurality of layers, that is situated on a side behind the third image region as viewed from a viewpoint for the first user or the second user, and the third generating includes generating a plurality of operating regions that are planar in form and that relate to the second user interface, in a form placed following a spherical face or a curved face.

19. A non-transitory computer readable medium storing computer executable instructions which, when executed by a computer, cause the computer to:

detect a state of a first user that distributes content including an image of a first virtual space, wherein the image includes a plurality of layers and the first virtual space is a three-dimensional virtual reality environment;

perform first display processing of displaying the image of the first virtual space, which is viewable by the first user watching the content via a first terminal device relating to the first user or is viewable by a second user watching the content via a second terminal device relating to the second user; and store a first avatar associated with the first user, wherein to perform the first display processing, the computer is further caused to:

first generating a first image region of a first layer, of the plurality of layers, including the first avatar, and second generating a second image region of a second layer, of the plurality of layers, including a first user interface, the first layer is situated at a first distance within the three-dimensional virtual reality environment as viewed from the first user, the second layer is situated at a second distance within the three-dimensional virtual reality environment as viewed from the first user, the second distance being farther from the first user than the first distance, and the first generating includes changing a state of the first avatar in the first image region of the first layer based on the detected state of the first user.

20. The non-transitory computer readable medium according to claim 19, wherein the computer is further caused to:

perform second display processing of displaying another image of a second virtual space, the other image being viewable by the first user via the first terminal device or the second user via the second terminal device, the other image includes a plurality of layers, and to perform the second display processing, the computer is further caused to:

third generating a third image region of a layer, of the plurality of layers, relating to a second user interface, and fourth generating a fourth image region of a layer, of the plurality of layers, that is situated on a side behind the third image region as viewed from a viewpoint for the first user or the second user, and the third generating includes generating a plurality of operating regions that are planar in form and that relate to the second user interface, in a form placed following a spherical face or a curved face.

* * * * *